US010534089B2

(12) United States Patent
Annapureddy et al.

(10) Patent No.: US 10,534,089 B2
(45) Date of Patent: Jan. 14, 2020

(54) METHOD AND APPARATUS FOR PROVIDING POWER-BASED ROUTE OPTIONS

(71) Applicant: QUALCOMM Incorporated, San Diego, CA (US)

(72) Inventors: Koushik Annapureddy, Santa Clara, CA (US); Balaji Srinivasan, Milpitas, CA (US); Kameshwar Kaza, San Jose, CA (US); Maulik Mehta, Santa Clara, CA (US); Naveen Yanamadala, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 15/713,510

(22) Filed: Sep. 22, 2017

(65) Prior Publication Data

US 2019/0094383 A1 Mar. 28, 2019

(51) Int. Cl.
| | | |
|---|---|---|
| *G01S 19/34* | (2010.01) | |
| *G01C 21/36* | (2006.01) | |
| *G06F 1/329* | (2019.01) | |
| *H04W 4/02* | (2018.01) | |
| *H04W 52/02* | (2009.01) | |
| *H02J 7/00* | (2006.01) | |

(52) U.S. Cl.
CPC .......... *G01S 19/34* (2013.01); *G01C 21/3626* (2013.01); *G01C 21/3676* (2013.01); *G01C 21/3697* (2013.01); *G06F 1/329* (2013.01); *H04W 4/025* (2013.01); *H04W 52/0261* (2013.01); *H02J 7/0047* (2013.01); *H02J 2007/005* (2013.01); *H04W 52/0216* (2013.01); *H04W 52/0219* (2013.01)

(58) Field of Classification Search
CPC .......... G01S 19/34; G01S 19/24; G01S 19/35; G01S 19/37; G01S 5/0027; G01C 21/3626; G01C 21/3697; G06F 1/329; H04W 4/025; H04W 52/0261
USPC .................................................... 342/357.74
See application file for complete search history.

(56) References Cited

U.S. PATENT DOCUMENTS

| | | | | |
|---|---|---|---|---|
| 9,411,052 B2 * | 8/2016 | Lennen | ................... | G01S 19/34 |
| 2014/0113660 A1 * | 4/2014 | Park | ..................... | H04W 4/025 |
| | | | | 455/456.3 |
| 2014/0173036 A1 * | 6/2014 | Das | ......................... | H04L 65/60 |
| | | | | 709/219 |
| 2015/0300832 A1 * | 10/2015 | Moore et al. | ......... | G01C 21/36 |
| | | | | 455/456.3 |

(Continued)

FOREIGN PATENT DOCUMENTS

| | | |
|---|---|---|
| JP | 2015219070 A | 12/2015 |
| WO | 2011079870 A1 | 7/2011 |

OTHER PUBLICATIONS

International Search Report and Written Opinion—PCT/US2018/050844—ISA/EPO—dated Feb. 22, 2019.

*Primary Examiner* — Harry K Liu
(74) *Attorney, Agent, or Firm* — Arnold J. Gum

(57) ABSTRACT

Techniques are provided which may be implemented using various methods and/or apparatuses in a mobile device to provide indications of power use associated with route options for navigation on a mobile device. Navigation route options may be displayed with associated indications of power usage information, enabling power usage to be utilized in determining route selection.

32 Claims, 13 Drawing Sheets

(56) References Cited

U.S. PATENT DOCUMENTS

2016/0169692 A1* 6/2016 Gupta ................ G01C 21/3415
                                                        701/521
2017/0030728 A1   2/2017 Baglino et al.

* cited by examiner via 1st Ave and Alaskan Way S      7 min 7 min without traffic     1.4 mi

START NAVIGATION via 1st Ave      8 min 7 min without traffic     1.3 mi via 1st Ave and 2nd Ave      8 min 7 min without traffic     1.4 mi

METHOD AND APPARATUS FOR PROVIDING POWER-BASED ROUTE OPTIONS

BACKGROUND

1. Field

The subject matter disclosed herein relates to electronic devices, and more particularly to methods and apparatuses for use in or with a mobile device to facilitate power management.

2. Information

Mobile devices generally operate on batteries. Applications may activate various functionalities on a mobile device such as graphics processors, Global Navigation Satellite System (GNSS) receivers, Wireless LAN transceivers (WLAN) and Wireless Area Network (WAN) transceivers. One of the challenges of running applications on a mobile device is the provision of solid performance while not using excessive power. This is particularly important when applications are used over long periods of time, as may be the case for navigation applications being utilized on long road trips, if the mobile device is not plugged in. Application operation is generally consistent, regardless of how long operation is anticipated, which may result in dead batteries and lost accessibility. Dead batteries are particularly vexing when the user does not have an opportunity to access a charging device. This can be particularly annoying if the user is utilizing the mobile device for end to end navigation and the mobile device runs out of power before reaching the destination or otherwise in an area the user is least familiar with, or post navigation, when the user needs to access other important functionality such as to place an important call from a phone with a dying battery.

SUMMARY

Some example techniques are presented herein which may be implemented in various method and apparatuses in a mobile device to possibly provide for or otherwise support displaying and enabling selection between routing options that are sensitive to power usage, enabling the choice of routes based upon navigation power usage in a mobile device. Example techniques and embodiments are also provided for power management windows and management of usage options.

In accordance with an example implementation, a method may be provided which comprises, receiving, by the mobile device, a request for navigation; sending, from the mobile device, a request for routing information in response to the request for navigation; receiving, by the mobile device, at least one route option associated with the request for routing information; displaying, by the mobile device, for each of the at least one route option, an indication of a first associated navigation power estimate for each of the at least one route option.

In accordance with another example implementation, an apparatus may be provided for use in a mobile device. The apparatus may comprise: means for receiving, at the mobile device, a request for navigation; means for sending, from the mobile device, a request for routing information; means for receiving, by the mobile device, at least one route option; means for displaying, by the mobile device, an indication of a first associated navigation power estimate for each of the at least one route option.

In accordance with yet another example implementation, a mobile device may be provided which comprises: one or more processing units configured to receive a request for navigation; a wireless transceiver configured to: send a request, from the mobile device, for routing information in response to the request for navigation; and receive at least one route option associated with the request for routing information; and the one or more processing units further configured to: display, using a user interface on the mobile device, an indication of a first associated navigation power estimate for each of the at least one route option.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
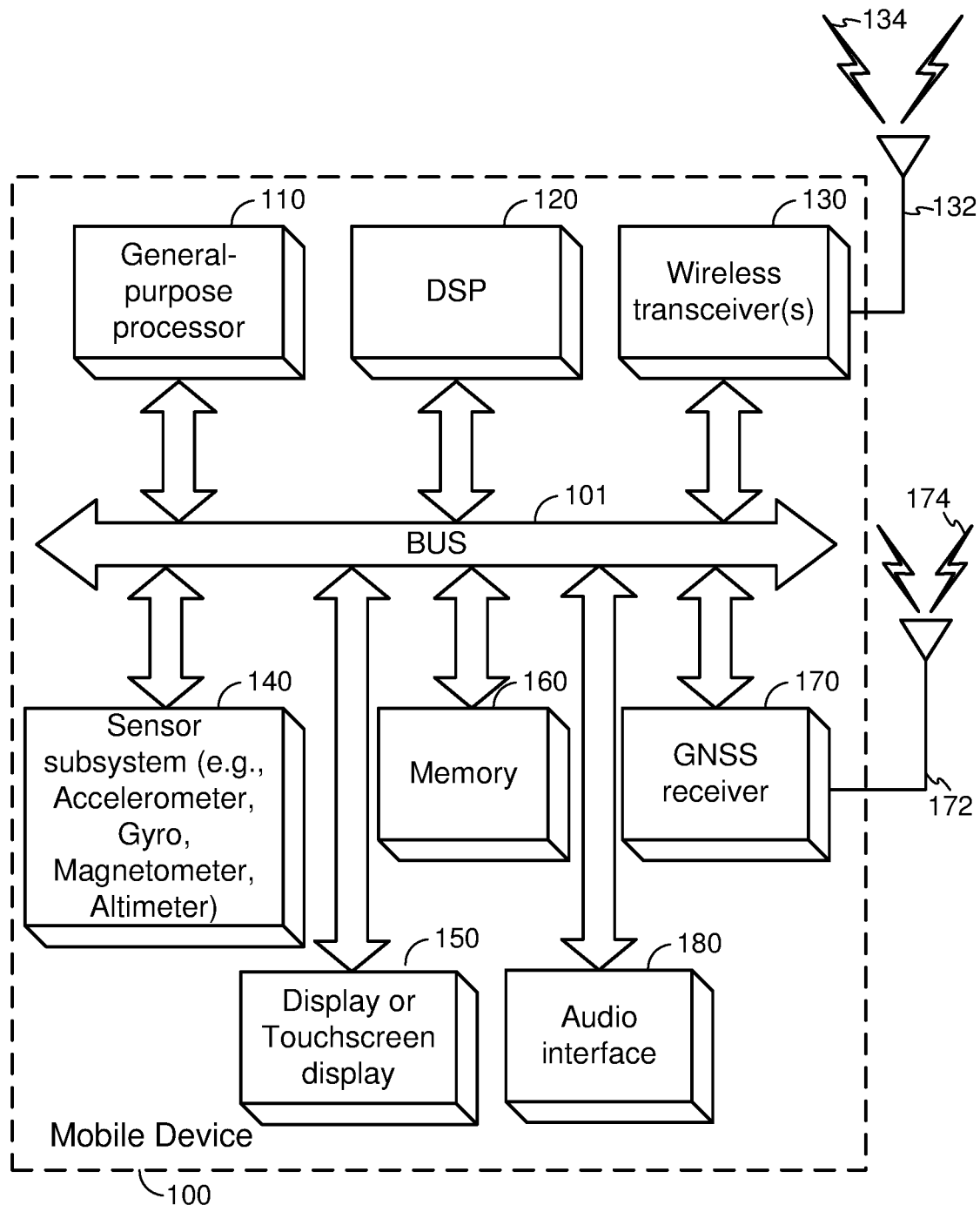
FIG. 1 is mobile device capable of navigation.

Some example techniques are presented herein which may be implemented in various methods, means and apparatuses in a mobile device and in a navigation-related system to provide for or otherwise support the ability to provide mobile device power estimates associated with route options for mobile navigation. Example techniques presented herein address various methods and apparatuses in a mobile device to possibly provide for or otherwise support displaying and enabling selection between routing options that are sensitive to power usage, enabling the choice of routes based upon navigation power usage in a mobile device. Example techniques and embodiments are also provided for power management windows and management of usage options such as display management (refresh rate, content update rate and other display features), image quality, image size, image turnoff, audio mode, audio volume, positioning rates, refresh rates, positioning methods, positioning sources and other settable parameters that may be applicable to and affect the power usage for a wide range of application types such as navigation applications, games, monitoring applications such as safety and medical applications, and tracking applications such as child trackers and fleet trackers. Managing power usage for applications that run for an extended period of time is important in battery operated devices to prevent premature shutdown (e.g., dead battery or other low power condition) before a charging opportunity is available. Navigation applications are one example of applications that are expected to run for extended periods of time and that may benefit from selecting options to better conserve power and to enable active choice of power options based upon power usage and/or estimates of remaining battery power based on operation in a power configuration profile.

In certain implementations, navigation functionality on a mobile device, when presented with a starting point and a destination, or just a destination, using the current position as the starting point, will output more than one route to be selected between. The route alternatives are typically associated with estimated travel time and distance associated with each route. Sometimes, the route choices are counter intuitive. For example, sometimes, the shorter and/or more direct route will take longer to traverse due to speed limits, stop lights and/or road conditions. In a similar manner, sometimes the total power used by the mobile device to provide navigation functionality can vary based on additional factors besides route length. For example, these factors may include location determination rate, location determination mode, target location accuracy, whether the mobile device is able to deprioritizing navigation over part of the route and/or ignore part of the route, whether GNSS is on during the entire route or if the device turns off GNSS during at least part of the route, whether GNSS runs in a power saving mode during all or part of the route, whether Wi-Fi and/or WAN are on or off, whether Wi-Fi active scans are used or not during at least part of the route, target location quality and/or accuracy, whether location quality is maintained in difficult environments and/or in constrained route areas, whether the map display in cycled off during at least part of the route, perhaps in reaction to lack of motion of the device or presence of only particular types of motion, whether map refresh rate is reduced during at least part of the route, whether map brightness is reduced during at least part of the route, and/or whether GNSS is opportunistically turned off, such as in GNSS signal blocked areas where Wi-Fi and/or WAN may be utilized exclusively.

Furthermore, route-related power estimates may be provided in numerical terms such as in Watts used for navigating over a particular route or in Watts remaining or other measure of remaining battery capacity. As it may turn out, less concise indications of power associated with a route, may be more useful to the user and may be provided either in the alternative or in addition to numerical estimates. For example, high, medium or low power usage, or red coloration on a battery icon (little battery capacity remaining), yellow coloration on a battery icon (moderate battery capacity remaining), or green coloration on a battery icon (a lot of battery capacity remaining). Other possible indications of battery power usage by the navigation function could include gauges (such as a gas indicator or a traditional analog speedometer), bar height and bars with different colors (such as red, green or yellow), pie charts, and other indications of quantity to be used or of quantity remaining. Furthermore, navigation power configuration can be set and/or modified at route selection or, in some embodiments, it can be set even after a route is already selected. For example, during actual navigation, the power usage configuration could be modified, possibly in response to batter power dropping below a threshold level or levels. Thus, as remaining battery power decreases, more aggressive power conservation modes may be implemented such as audio output only (no screen output) or output only when in proximity to a decision point (turn, destination, highway entrance or exit). In a power saving embodiment, navigation may be put to sleep or otherwise paused while the device is previously traversed areas of the route. In an embodiment, the modification to the power usage configuration could be pre-configured in regards to which power saving options are selected, in which order and/or in which combination and based on which triggers. In an embodiment, the modification to the power usage configuration could be triggered or reconfigured through modifications input via a power management screen such as the embodiment in FIG. 11. In an embodiment, modification to the power usage could be performed relative to a particular route; for example, each route might have a dial or slider than can be adjusted to modify the power utilized while traversing that route or parts of that route where the overall power usage rate is modified by the slider or dial and different power reduction algorithms are associated with different settings on the slider or dial. The settings could also continuous or granular. For example, the slider or dial may have a limited number of pre-configured settings that are allowed such as a high, medium or low setting, each setting being associated with some configuration/combination of power saving features or, in a high-power mode, potentially with few or none of the power saving features. The power configuration settings may also be associated with alerts such as warnings that a particular setting will result in power loss before getting to the destination. The power configuration settings may also be associated with colors or other visual indicators such as batteries, as in FIG. 10A, or other visual indicators. Quantitative indicators can also be associated with remaining time that the battery will be active, remaining power, total time or total power and other indicators of battery longevity.

In an embodiment, there could also be a single power indicator for all routes, where the indication displays power information for the route highlighted or otherwise tentatively selected prior to making a final selection; in this embodiment, the different routes could be clicked on to provide an indication of power usage or of remaining power or both for navigation power used based upon that clicked upon route.

By outputting not just route selection options but also indications of associated navigation power, route selection can be based on the route that uses the least power or based on the best accuracy and timeliness or to provide ample battery longevity to provide navigation all the way to a destination, rather than running out prematurely.

FIG. 1 illustrates an embodiment of a mobile device, a non-limiting example for implementing the various methods and techniques illustrated in the figures and text herein. As shown in FIG. 1, in an embodiment, mobile device 100, which may also be referred to as a UE (or user equipment), may include a general-purpose processor 110. The general-purpose processor 110 may sometimes be referred to by other names such as an applications processor, a general processor, a main processor or a processor. Various functionality may run on the general-purpose processor 110 such as applications, operating system functions and general mobile device functions. General-purpose processor 110 may also include processors, including additional processors, that perform more specialized functionality, or parts thereof, such as processing related to camera sensors, video, audio and wireless signal processing such as wireless baseband processors. In an embodiment, mobile device 100 may also include a DSP 120, which may be used for various compute processing tasks such as video and graphical processing, display management, GNSS signal processing, WAN signal processing and Wi-Fi signal processing. Some tasks may, in some embodiments, be split between the general-purpose processor and one or more DSPs such as location determination, where signal search, processing and correlation may happen at the DSP level while location determination may be calculated at the general-purpose processor 110.

In mobile device 100, wireless transceiver(s) 130 may support various wide area network (WAN) connections (e.g., Global System for Mobile Communications (GSM), Code Division Multiple Access (CDMA), Wideband CDMA (WCDMA), Long Term Evolution LTE), $5^{th}$ Generation Wireless (5G), High Rate Packet Data (HRPD)), wireless LAN connections (e.g., Wi-Fi/802.11) and personal area network (PAN) connections (e.g., Bluetooth) or combinations thereof. Wireless transceiver(s) 130 may be implemented by multi-mode transceivers, discrete transceivers, separate or shared antennas (132) or various combinations thereof.

Mobile device 100 may also contain a GNSS receiver (170) and GNSS antenna 172. The GNSS receiver 170 may measure various signals (112) received from satellites belonging to an SPS or Global Navigation Satellite System (GNSS) such as GPS, GLONASS, Galileo or Beidou. These signal measurements may be utilized to determination location either alone or in combination with terrestrial signals such as WAN, WLAN and PAN signals.

Mobile device 100 may include various sensors and may, in some embodiments be discrete or in some embodiments, be integrated into a sensor subsystem 140. Sensors may include, in various embodiments, accelerometers such as 3D accelerometers, gyros such as 3D gyros, and magnetometers, often used alone or in combination to determine dead reckoning output such as heading, distance, and orientation. Other sensors, in an embodiment, may include camera sensors, light sensors, and pressure sensors or other altimeters or other sensor types such as medical and chemical sensors.

Mobile device 100 may include a display. In some embodiments, the display may be a touchscreen, used for both visual output and touch-driven input. The display be associated with a virtual keyboard on the display, sometimes on demand, or by an actual keyboard, for character input. Mobile device 100 may include an audio interface 180, including in various embodiments, speakers and associated drivers, for audio output and one or more microphones for audio input. Mobile device 100 may also include memory 160, which may comprise FLASH, RAM, ROM, disc drive, or FLASH card or other memory devices or various combinations thereof.

Figure 2:
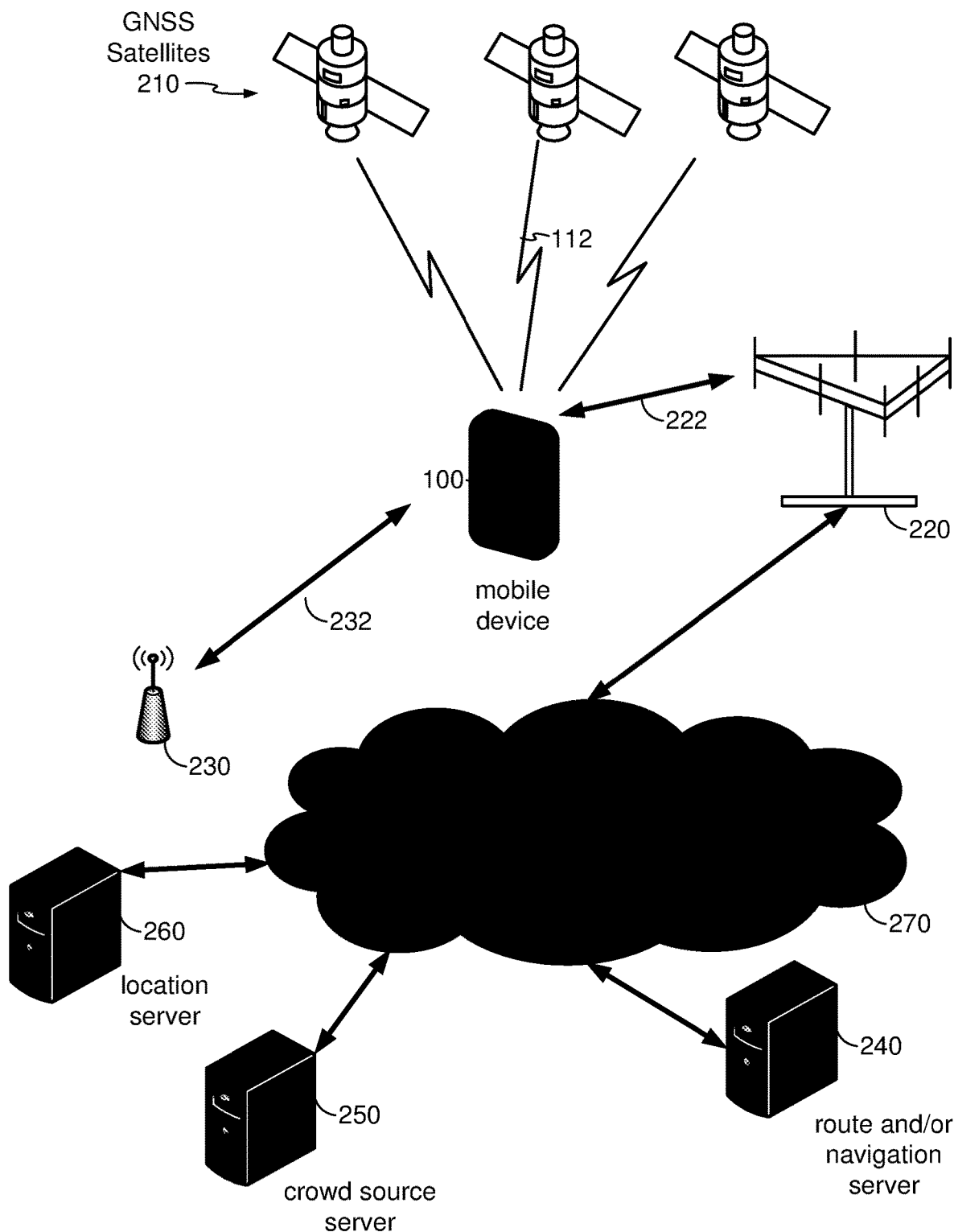
FIG. 2 is a system diagram including navigation-capable mobile devices and supporting server devices.

FIG. 2 illustrates a system and means for implementing the various methods and techniques described in the figures and text herein. As shown in FIG. 2, in an embodiment, mobile device 100, which may also be referred to as a UE (or user equipment), may transmit radio signals to, and receive radio signals from, a wireless communication network. In one example, mobile device 100 may communicate, via wide area network (WAN) wireless transceiver 220 and wireless antenna 132 with a cellular communication network by transmitting wireless signals to, or receiving wireless signals from a WAN wireless transceiver 220 which may comprise a wireless base transceiver subsystem (BTS), a Node B or an evolved NodeB (eNodeB) over wireless communication link 222. Similarly, mobile device 100 may transmit wireless signals to, or receive wireless signals from local transceiver 230 over wireless communication link 232. A local transceiver 230 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

Examples of network technologies that may support wireless transceiver 130 are Global System for Mobile Communications (GSM), Code Division Multiple Access (CDMA), Wideband CDMA (WCDMA), Long Term Evolution LTE), $5^{th}$ Generation Wireless (5G), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. WAN wireless transceivers 220 may comprise deployments of equipment providing subscriber access to a wireless telecommunication network for a service (e.g., under a service contract). Here, a WAN wireless transceiver 220 may perform functions of a wide area network (WAN) or cell base station in servicing subscriber devices within a cell determined based, at least in part, on a range at which the WAN wireless transceiver 220 is capable of providing access service. Examples of WAN base stations include GSM™, WCDMA™, LTE™, CDMA™, HRPD™, WiFi™, BT, WiMax™, and/or $5^{th}$ Generation (5G) base stations. In an embodiment, further wireless transceiver 130 may comprise a wireless LAN (WLAN) and/or PAN transceiver. In an embodiment, mobile device 100 may contain multiple wireless transceivers including WAN, WLAN and/or PAN transceivers. In an embodiment, radio technologies that may support wireless communication link or links (wireless transceiver 130) further comprise Wireless local area network (e.g., WLAN, e.g., IEEE 802.11), Bluetooth™ (BT) and/or ZigBee™.

In an embodiment, mobile device 100, using wireless transceiver(s) 130, may communicate with servers 240, 250 and/or 260 over a network 270 through communication interface(s) 308. Here, network 270 may comprise any combination of wired or wireless connections and may include WAN wireless transceiver 220 and/or local transceiver 230 and/or servers 240, 250 and/or 260. In an embodiment, network 270 may comprise Internet Protocol (IP) or other infrastructure capable of facilitating communication between mobile device 100 and servers 240, 250 and/or 260 through local transceiver 230 or WAN wireless transceiver 220. In an embodiment, network 270 may comprise cellular communication network infrastructure such as, for example, a base station controller or packet based or circuit based switching center (not shown) to facilitate mobile cellular communication with mobile device 100. In an embodiment, network 270 may comprise local area network (LAN) elements such as Wi-Fi APs, routers and bridges and may in that case include or have links to gateway elements that provide access to wide area networks such as the Internet. In other implementations, network 270 may comprise a LAN and may or may not have access to a wide area network but may not provide any such access (if supported) to mobile device 100. In some implementations, network 270 may comprise multiple networks (e.g., one or more wireless networks and/or the Internet). In one implementation, network 270 may include one or more serving gateways or Packet Data Network gateways. In addition, one or more of servers 240, 250 and/or 260 may be a route and/or navigation server, a crowd source server, and/or a location server.

In various embodiments, and as discussed below, mobile device 100 may have circuitry and processing resources capable of obtaining location related measurements (e.g. for signals received from GPS, GNSS or other Satellite Positioning System (SPS) satellites 210, WAN wireless transceiver 220 or WLAN or PAN transceiver 230 and possibly computing a position fix or estimated location of mobile device 100 based on these location related measurements. In some implementations, location related measurements obtained by mobile device 100 may be transferred to a location server such as an enhanced serving mobile location center (E-SMLC) or SUPL location platform (SLP) (e.g. which may be one of servers 240, 250 and/or 260) after which the location server may estimate or determine a location for mobile device 100 based on the measurements. In the presently illustrated example, location related measurements obtained by mobile device 100 may include measurements of signals (112) received from satellites belonging to an SPS or Global Navigation Satellite System (GNSS) (210) such as GPS, GLONASS, Galileo or Beidou and/or may include measurements of signals (such as 222 and/or 232) received from terrestrial transmitters fixed at known locations (e.g., such as WAN wireless transceiver 220). Mobile device 100 or a separate location server may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 240, 250 or 260 may be capable of providing positioning assistance data to mobile device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, servers 240, 250 or 260 may comprise an almanac which indicates locations and identities of wireless transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from WAN wireless transceiver 220 and/or wireless local transceiver 230 and/or may obtain a round trip signal propagation time (RTT) between mobile device 100 and a WAN wireless transceiver 220 or wireless local transceiver 230. A mobile device 100 may use these measurements together with assistance data (e.g. terrestrial almanac data or GNSS satellite data such as GNSS Almanac and/or GNSS Ephemeris information) received from a location server 260 to determine a location for mobile device 100 or may transfer the measurements to a location server 260 to perform the same determination.

In various embodiments, location related measurements comprising location and an indication or indications of location-related power utilization obtained by mobile device 100 may be transferred to a crowd source server 250. The location may be determined through various means, as described above. The indications of location-related power utilization provided by the mobile device to the crowd source server may comprise various metrics associated with location determination such as time utilized determine a location, number of visible satellites, number of visible terrestrial transceivers, mode of location determination, power consumed to determine location, power consumed by the application processor, total current draw, applications processor current draw, location fix rate, and location accuracy. In an embodiment, the crowd source server combines various location-tagged measures of location-related power utilization from multiple mobile devices to estimate power associated with position determination at a location or in a nearby area. The combined location-related power utilization from locations and/or areas along the route can be combined to estimate the power utilized by a mobile device for navigation that follows a route that traverses those locations and/or areas. The estimate of the power utilized by a mobile device for navigation may similarly be calculated on a server such as the crowd source server 250 or the route server 240, using the information gathered by crowd source server 250.

In an embodiment, the mobile device may download location-referenced power utilization information from the crowd source server 250 and calculate an estimate of power to be utilized by the mobile device for navigation for various routes. In an alternative embodiment, the mobile device could calculate power to be utilized by the mobile device for navigation for various routes on the mobile device without access to crowd source server power utilization information. For example, power utilization may be calculated, on the mobile or on the server, using an estimated time to traverse a given route and an estimated average power usage rate (power usage per unit of time). Similarly, power utilization may be calculated, on the mobile or on the server, using an estimated total travel distance associated with a route and an estimated average power usage per distance. Given the vagaries of traffic and other driving or traversal conditions, the traversal time-based estimate that uses an average power per unit of time may be used to reflect the impact of variable road and traffic conditions, assuming that the traversal time estimate allows for traffic and other conditions.

In various embodiments, route alternatives and associated traversal time estimates, and in some embodiments, traversal power estimates, may be determined at a route and/or navigation server 240 (henceforth referred to as a route server). A mobile device 100 may send start and destination locations to a route server 240 and receive, from the route server 240, various alternative routes between the start and destination locations, as well as traversal time estimates and, in some embodiments, navigation/location-related power estimates. In an embodiment, the route server 240 may also provide map information and point of interest information for areas along the route. In an embodiment, the route server 240 may also provide the location of terrestrial transceivers such as WAN wireless transceivers 220, WLAN (e.g., Wi-Fi) wireless local transceivers 230 and PAN (e.g. Bluetooth) wireless local transceivers 230. The various information provided by the route server may be pre-downloaded for use on the mobile or the information may be downloaded on demand or the information may be downloaded based on location, providing for example, map information and associated visible transceivers for areas along the route.

A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or movable device. Typically, though not necessarily, a mobile device may support wireless communication such as using GSM, WCDMA, LTE, CDMA, HRPD, Wi-Fi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 3:
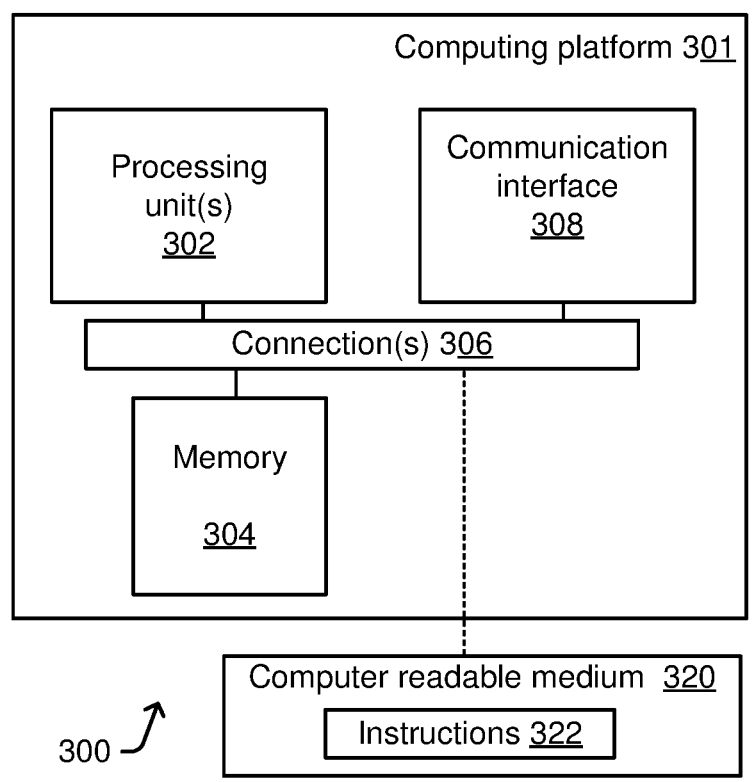
FIG. 3 is network based server, as may be used for a crowd source server, a location server, a route/navigation server or other network-based server.

FIG. 3 illustrates a server as a non-limiting example of means for implementing the methods and techniques described herein. Referring to FIG. 3, in an embodiment, the servers 240, 250 and 260 and other network based servers, may use the computing platform 301 embodiment of FIG. 3. The computing platform may comprise one or more processors, here, processing unit(s) (302) comprising one or more general purpose processors, special processors such as graphics processors and/or communications processors or baseband processors. Computing platform 301 will include at least one communication interface 308 to send communications over network 270. The communication interface 308 may comprise a network interface card or cards or other interface for interfacing to an Intranet and/or Internet over network 270. Communication interface 308 may also comprise, in some embodiments, a wireless interface or interfaces such as WAN, WLAN and Bluetooth wireless interfaces. The computing platform may also comprise various memory (304), such as Cache, RAM, ROM, disc, and FLASH memory. In an embodiment, Computing platform 301 may also access computer readable medium 320 such as hard disk drives, tape drives, flash drives and other memory devices.

Figure 4:
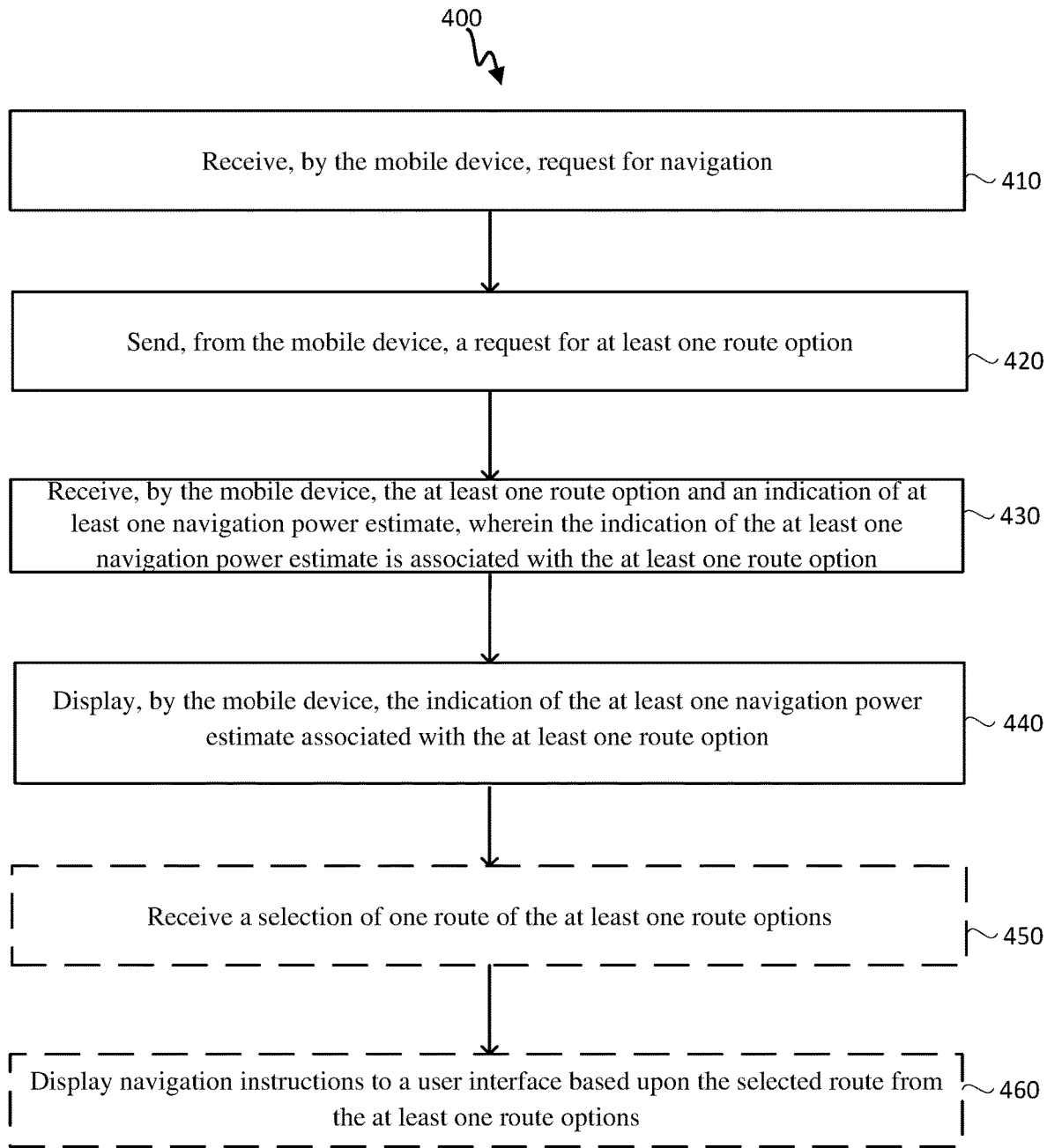
FIG. 4 illustrates an embodiment for providing navigation and route power-related information on a mobile device where the navigation power estimate is received from a server.

FIG. 4 illustrates a method and technique for requesting and displaying route options from a server. The means to implement the methods and techniques of FIG. 4 include, but are not limited to the apparatus and systems of FIGS. 1-3. Referring to FIG. 4, in an embodiment, a mobile device may request and obtain routing information from a server, such as a route server, to access routing options and power estimate information. In an embodiment, in step 410, the mobile device may receive a request for navigation from a user interface on the mobile device. The user interface may variously include a display or touchscreen display 150 and/or an audio interface 180 comprising speaker(s) and a microphone. In an embodiment, the microphone may capture audio input and voice recognition functionality may be used to convert the captured audio input to data and/or indications of starting points and destinations, route selections, option selections, and miscellaneous navigation-related data and command input. In an embodiment, the navigation request and navigation configuration information may be received from display or touchscreen display 150 via selectable options and/or virtual keypads or, in the alternative, received via physical keypad, buttons and/or dials.

In an embodiment, in step 420, the mobile device sends a request for at least one route option to a route server. One skilled in the art realizes that the request could also be satisfied by other servers such as a location server, a map server, an almanac server, and/or a navigation server or that the various functionalities from multiple servers could be combined into a single server. The route server, or other server, may receive, along with the request for route options, the starting location and destination location. The request may also include other information that may be used to determine power estimates and/or remaining power post route relative to navigation via each route option. For example, information relative to the capabilities of the mobile device and the estimated power usage for each capability may be used to estimate the amount of power used for navigation for each route. The current location determination mode and/or configuration may be used to determine the amount of power used for each fix and/or the ongoing power usage for continuous location determination. The current navigation configuration and/or mode may help determine, for example, when location determination is active and at what rate, what type of location determination is used, and other configurable factors that would impact battery use during navigation. For example, in an embodiment, location determination may be activated or could be determined at a higher rate or with greater accuracy only on parts of the route that have not been previously visited or that are not within an area of regular presence and/or navigation activity. In an embodiment, location determination frequency could be increased in areas that are unfamiliar or are not frequently visited. In an embodiment, location determination accuracy could be modified, for example, to provide greater accuracy in unfamiliar areas and less accuracy in familiar areas. In an embodiment, location determination could be performed using GNSS or other high accuracy modality in areas that are unfamiliar or are not frequently visited while location determination could be performed using terrestrial transceivers in areas that are familiar or frequently visited. Also, in an embodiment, the current battery status and/or remaining power may be utilized to determine remaining battery after a mobile device has completed navigation on a route. Similarly, the screen could be turned off in areas that are familiar, providing audio-only output as an alternative, and the screen could be turned on in areas that are unfamiliar. The above discussed parameters are just a few of the device configuration parameters than can be set and, in some embodiments, communicated, to the route server to assist in calculating navigation power usage.

In an embodiment, in step 430, the mobile device receives, from the route server, or other server, at least one route option and at least one indication of at least one navigation power estimate, wherein the indication of the at least one navigation power estimate is associated with the at least one route option. In various embodiments, the navigation power estimate is the estimated navigation power consumption associated with a respective route option. In various embodiments, a navigation power estimate may also be associated with various power reduction options. In an embodiment, the at least one indication of at least one navigation power estimate could be indicated as high, medium or low or, in an embodiment, it may comprise an actual estimated calculated power consumption during navigation. In an embodiment, the at least one indication of at least one navigation power estimate could be a related variable such as route time or total route distance that the mobile device may utilized to further determine or modify the at least one indication of at least one navigation power estimate at the mobile device.

In an embodiment, in step 440, the mobile device displays the indication of the at least one navigation power estimate associated with the at least one route option. In an embodiment, the different route options are displayed as a list with each route option displayed adjacent to estimated travel time and the indication of the at least one navigation power estimate for that respective route option. Alternatively, the different route options are displayed as a list with each route option displayed adjacent to estimated travel time or the indication of the at least one navigation power estimate for that respective route option, wherein a configuration button or screen option toggles the display between the estimated travel time and the indication of the at least one navigation power estimate for that respective route option.

In an embodiment, in optional step 450, the mobile device receives a selection of one route of the at least one route option. The selection input is typically received from the touchscreen display 150, typically in response to a screen selection of one route of the at least one route option but may, in some embodiments, alternatively be received from the audio interface 180, a keyboard interface, a dial, button, or other input device.

In an embodiment, once a route option has been selected, the mobile device may send an indication of the selected route such as a numerical reference, a tag or other identifier for the selected route, to the route server, requesting navigation instructions associated with the indicated selected route. In some embodiments, the navigation instructions for the entire route may be downloaded at once. In other embodiments, instructions for locations along the route may be downloaded when needed, typically based upon the navigation instructions pertinent to the current location of the mobile device. In an embodiment, partial navigation instructions, such as a high-level overview of the route (streets, roads, highways, exits, etc.) to be taken and/or a high-level map of the route to be taken may be downloaded in step 430 along with each route option, and is displayed or displayable on the screen to help inform the routing decision.

In an embodiment, in optional step 460, the mobile device displays navigation instructions, downloaded from a route server, to a user interface based upon the selected route from the at least one route option(s). The navigation instructions may be output via the display or touchscreen display 150, via the audio interface 180 or remoted to an external device, via a wireless link such as Bluetooth or Wi-Fi, or some combination of the above. In an embodiment, the output means may be switched between the touchscreen display 150 and the audio interface 180 or both. For example, in familiar and/or frequently traversed regions, the output may be limited to only audible instructions while, in response to being in an unfrequently traversed area, the display or touchscreen display 150 may be output to and active at the same time as audible alerts.

Figure 5A:
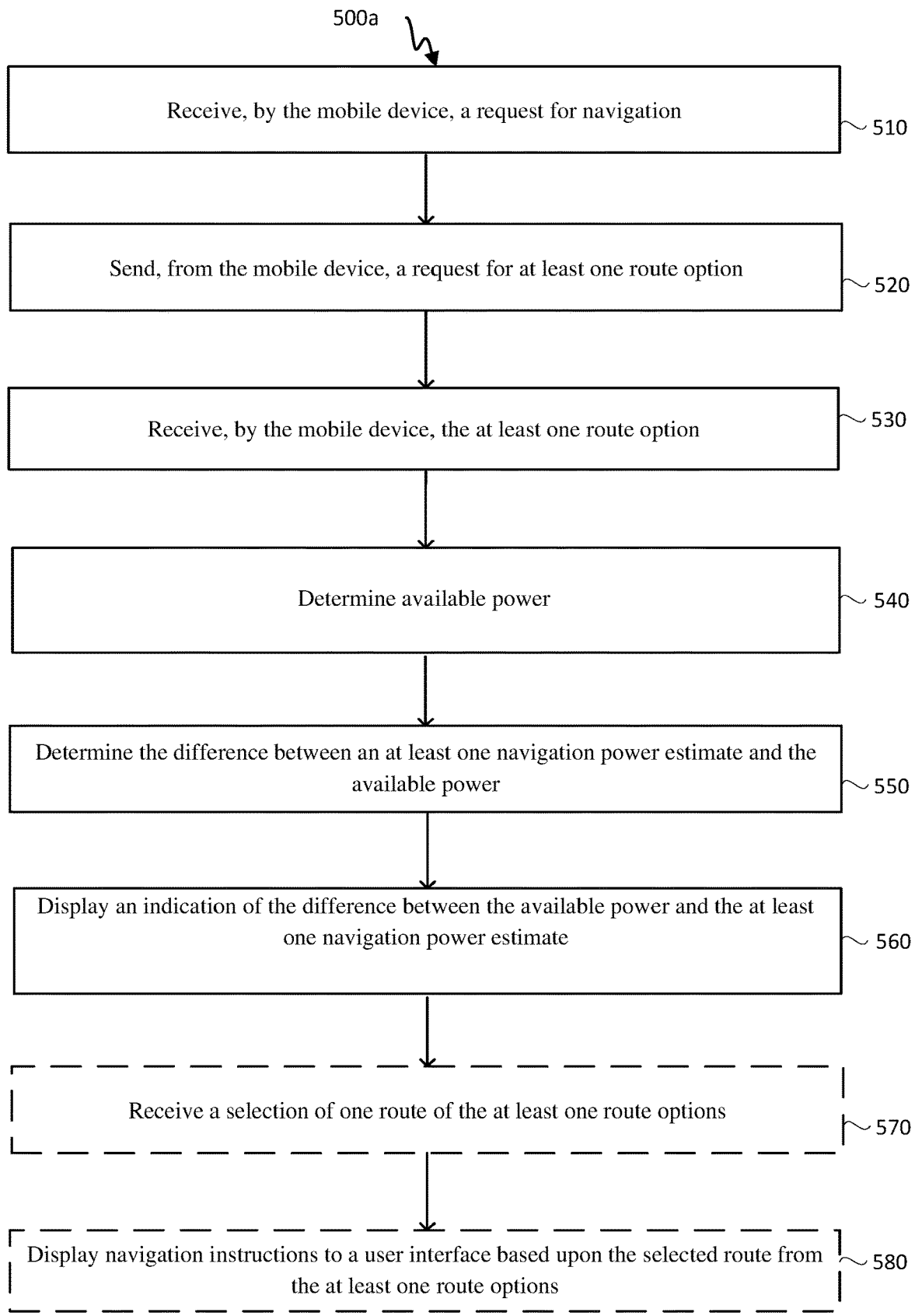
FIG. 5A illustrates an embodiment for providing navigation and power-related information on a mobile device including the determination of an estimate of remaining power post navigation.

FIG. 5A illustrates a method and technique for requesting and displaying route options from a server. The means to implement the methods and techniques of FIG. 5A include, but are not limited to the apparatus and systems of FIGS. 1-3. Referring to FIG. 5A, in steps 510 through 530, a mobile device may, as in FIG. 4, receive a request for navigation step 510 (as in step 410); send a request for at least one route option step 520 (as in step 420); and receive the at least one route option step 530 (as in step 430), obtaining routing information from a route server to access routing options and power estimate information to a mobile device. In various embodiments, in Step 530, the mobile device receives, from the route server, or other server, the at least one route option and, optionally in various embodiments, an indication of at least one navigation power estimate, wherein the indication of the at least one power estimate is associated with the at least one route option. In other embodiments, the indication of at least one navigation power estimate may be calculated on the mobile device. In an embodiment, the at least one indication of at least one navigation power estimate could be indicated as high, medium or low or, in an embodiment, it may comprise an actual estimated calculated power consumption during navigation. In an embodiment, the at least one indication of at least one navigation power estimate could be a related variable such as route time or total route distance such that the mobile device may further determine or utilize the at least one indication of at least one navigation power estimate to determine a derivative navigation power estimate at the mobile device. The derivative navigation power estimate may be more accurate than the received indication of the at least one navigation power estimate or it may be in different format or units. For example, the received indication of the at least one navigation power estimate might comprise estimated route traversal time or distance while the derivative navigation power estimate may be in Watts or other power units. The indication of the at least one navigation power estimate, if it is in different units from the available power measurement, would need to be converted to the same units as the available power measurement, such that the navigation power estimate (if in the correct units) or the derivative navigation power estimate may be subtracted from the available power to determine the remaining power post navigation using a particular route. Thus, if the time to traverse a route is provided, it may be multiplied by an estimate of navigation power usage per unit of time to obtain the derivative navigation power estimate. If distance to traverse a route is provided, it may be multiplied by an estimate of navigation power usage per unit of distance to obtain the derivative navigation power estimate.

In an embodiment, the step 540, the mobile device determines available power. Available power may be determined in various ways. In an embodiment, available power may be determined by determining voltage at a known point or across a known circuit and comparing voltage detected to a look up table of remaining power. In an embodiment, available power may be determined by determining current at a known point or across a known circuit and comparing the current detected to a look up table of remaining power. In an embodiment, both current and voltage may be considered. In an embodiment, power may also be accessed through a system power management application and/or through API calls.

In an embodiment, in step 550, the mobile device determines the difference between an at least one navigation power estimate and the available power. The at least one navigation power estimate may be the at least one indication of at least one navigation power estimate or it may need to be converted to the appropriate units or otherwise scaled or modified, in which case, the derivative navigation power estimate could be utilized to determine the at least one navigation power estimate.

In an embodiment, in step 560, the mobile device displays an indication of an associated difference between the available power and the at least one navigation power estimate. The indication of an associated difference between the available power and the at least one navigation power estimate could be a numerical estimate, for example, based on estimated remaining battery life in Watts or in hours or Watt-hours or other measures. In an embodiment, the indication of an associated difference between the available power and the at least one navigation power estimate could be graphical; for example, the indication could be a picture-based representation such that shown in FIG. 10A, with remaining battery life portrayed by bar height and color. For example, if the bar is green, it could mean that the battery contains over a first threshold of battery life present and/or there is no need to be concerned about remaining battery life. For battery life and/or power below the first threshold but above a second threshold, the power indicator showing battery level could be colored yellow indicating a warning level or that power is likely to run out in the near future. For battery life and/or power below the second threshold the power indicator showing battery level could be colored red, for example, as a warning of imminent battery failure. Similarly, if battery life will run out before navigation completes for a given route, the power indicator, or parts thereof, showing battery level could be colored red or caused to flash or otherwise send an alert via the user interface, that navigation will likely not be available over at least part of the route.

In an embodiment, in optional step 570, the mobile device receives a selection of one route of the at least one route option. The selection input is typically received from the touchscreen display 150, typically in response to a screen selection of one route of the at least one route option but may, in some embodiments, alternatively be received from the audio interface 180, a keyboard interface, a dial, button, or other input device.

In an embodiment, once a route option has been selected, the mobile device may send an indication of the selected route such as a numerical reference, a tag or other identifier for the selected route, to the route server, requesting navigation instructions associated with the indicated selected route. In some embodiments, the navigation instructions for the entire route may be downloaded at once. In other embodiments, instructions for locations along the route may be downloaded when needed, typically based upon the navigation instructions pertinent to the current location of the mobile device. In an embodiment, partial navigation instructions, such as a high-level overview of the route (streets, roads, highways, exits, etc.) to be taken and/or a high-level map of the route to be taken may be downloaded in step 530 along with each route option, and is displayed or displayable on the screen to help inform the routing decision.

In an embodiment, in optional step 580, the mobile device displays navigation instructions, downloaded from a route server, to a user interface based upon the selected route from the at least one route option(s). The navigation instructions may be output via the display or touchscreen display 150, via the audio interface 180 or remoted to an external device, via a wireless link such as Bluetooth or Wi-Fi, or some combination of the above. In an embodiment, the output means may be switched between the touchscreen display 150 and the audio interface 180 or both. For example, in familiar and/or frequently traversed regions, the output may be limited to only audible instructions while, in response to being in an unfrequently traversed area, the display or touchscreen display 150 may be output to and active at the same time as audible alerts.

Figure 5B:
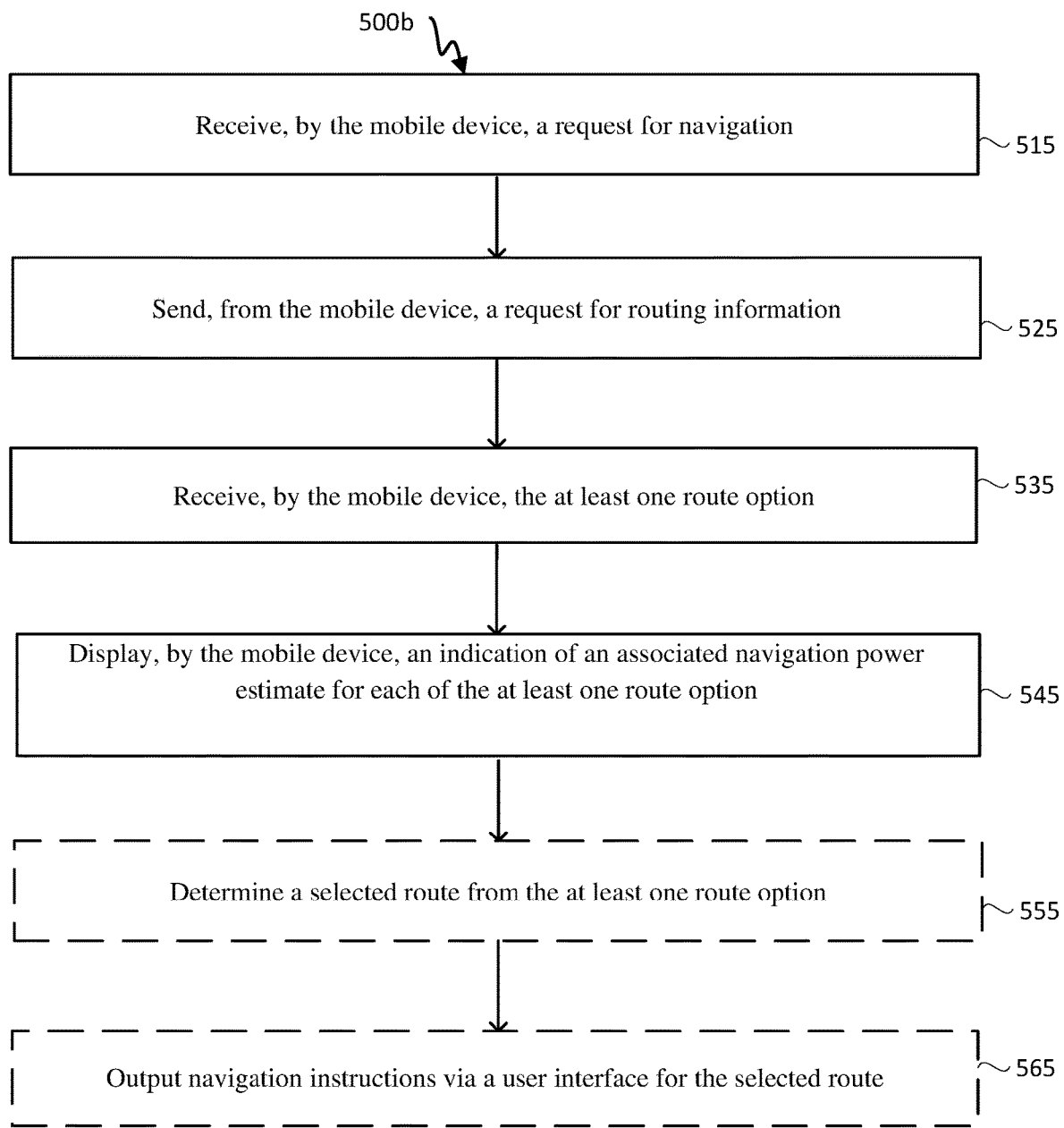
FIG. 5B illustrates a general embodiment for providing navigation and power-related information on a mobile device.

FIG. 5B illustrates a method and technique for requesting and displaying route options from a server. The means to implement the methods and techniques of FIG. 5B include, but are not limited to the apparatus and systems of FIGS. 1-3. Referring to FIG. 5B, the specified embodiment and associated means to implement it, are intended to encompass various embodiments including the embodiment illustrated in FIG. 4, where an indication of a navigation power estimate is displayed for each route, and the embodiment in FIG. 5A, wherein an estimate of the remaining power after traversing a route is displayed for each route. It is realized that both estimated power and estimated remaining power are informative options that can be used in various embodiments to inform relative to the power requirements of each route. It is further realized that a navigation power estimate may be calculated on the mobile device or calculated on the route server, or calculated on another network server or device. It is also realized that an indication of the navigation power estimate need not be an exact measure of power usage but may be based on approximate measures such as an average fix rate, predicted methods of location determination, estimated amount of time to traverse the route, estimated distance to traverse the route, mode of location used on the route, areas of active location determination and areas that are ignored or de-prioritized along the route. It is further realized that estimates may be mobile device specific or may be average estimates not specific to any one mobile device. Similarly, the indication of the navigation power estimate may be very general such as a color (green for good, yellow for caution, red for not recommended, or other colors and codes), a bar illustrating either power used or power remaining or both, or a battery showing a remaining power level post route, a battery showing amount of battery to be used by the route (for example, using a colored or shaded portion of the battery indicator). The indication of the navigation power estimate may be also be more specific such as an estimated number of Watts of power usage associated with each route, or other quantitative measures of power or through the use of comparative bar charts or graphs.

It is also realized that the power use configuration may be modified for the mobile device for all configurations, or may be modified for a specified route or may be modified for a part of a route or otherwise configured. The power use configuration could be modified utilizing sliders, dials or other indicators associated with each route, power management windows or multivariable power usage configuration windows. Navigation power configuration, in an embodiment, may be modified before, during or after presentation and selection of route options.

Referring to FIG. 5B, in step 515, similar to step 410 and step 510, the mobile device may receive a request for navigation from a user interface on the mobile device. The user interface may variously include a display or touchscreen display 150 and/or an audio interface 180 comprising speaker(s) and a microphone. The user interface may also comprise, in various embodiments, sensors such as capacitive sensors, touch sensors, and motion sensors such as accelerometers and gyros.

In an embodiment, the microphone may capture audio input and voice recognition functionality may be used to convert the captured audio input to data and/or indications of starting points and destinations, route selections, option selections, and miscellaneous navigation-related data and command input.

In an embodiment, the navigation request and navigation configuration information may be received from display or touchscreen display 150 via selectable options and/or virtual keypads or, in the alternative, received via physical keypad, buttons and/or dials. For example, a list of routes with associated navigation power indications may be displayed and a specific route may be selected by the detection of tapping on or touching on the area of the screen associated with a particular route. Other similar input may be used to touch selectable options associated with each route (such as high, medium and lower power use options) or the detection of a dragging input on a slider icon or the detection of touch input relative to a dial icon may be utilized to configure navigation power indications.

In an embodiment, input regarding option and/or route selection may be received relative to moving the mobile device in various manners such as a particular touch or shake or tilt of the device or combination thereof. For example, receiving touch input to select a particular route but then receiving tilt input to change the navigation power settings for that route (or, in some embodiments, for all routes) from more power efficient to higher power usage configurations. Similarly, the selection could be made based on navigation and location determination performance parameters.

In an embodiment, in step 525, similar to step 420 and step 520, the mobile device sends a request for at least one route option to a route server. One skilled in the art realizes that the request could also be satisfied by other servers such as a location sever, a map server, an almanac server, and/or a navigation server or that the various functionalities from multiple servers could be combined into a single server. The route server, or other server, may be sent, along with the request for route options, the starting location and destination location. In various embodiments, the starting location and/or the destination location may be a determined Lat/Long or other location, it may be a name or reference to a location such as home, Macy's, work, or other label, it may be a cross street, it may be a point reference on a map, it may be a visible base station or multiple visible base stations, it may be a landmark, or other indications of a location or it may be an address of part thereof. The request may also include other information that may be used to determine route selection and/or power estimates and/or remaining battery power after traversing a route via each route option. For example, information relative to the capabilities of the mobile device, the current configuration relative to position location determination and navigation software and hardware, and the estimated power usage for each capability may be used to estimate the amount of power used for navigation for each route. For example, information may, in some embodiments include an average fix rate, available location modes, and/or power estimates for each mode. The current location determination mode and/or configuration may be used to determine the amount of power used for each fix and/or the ongoing power usage for continuous location determination. In an embodiment, the request may also include a request for information on one or more low power navigation options, wherein the low power navigation option may correspond to a predesignated low power configuration(s) or may be specified by either the mobile device or the route server. In an embodiment, the route server may also provide power configuration control settings, turning on and off different navigation and location determination power settings, UI settings such as screen on/off or screen brightness or audio only, GNSS fix rates, network mode settings versus GNSS versus hybrid fix determination, either for the entire route or sensitive to the needs of a given part of the route, or otherwise managing navigation power settings to optimize power usage for each route. Furthermore, power settings could be predownloaded with route information or they could be dynamically provided and/or updated with download of ongoing route instructions and map refreshes.

The navigation configuration and/or mode may help determine, for example, when location determination is active and at what rate, what type of location determination is used, and other configurable factors that would impact battery use during navigation. For example, in an embodiment, location determination may be activated or could be determined at a higher rate or with greater accuracy on parts of the route that have not been previously visited or that are not within an area of regular presence and/or navigation activity while location determination and navigation can be made less accurate or refreshed less often in areas of user familiarity.

Thus, location determination frequency could be increased in areas that are unfamiliar or are not frequently visited. In an embodiment, location determination accuracy could be modified, for example, to provide greater accuracy in unfamiliar areas and less accuracy in familiar areas. In an embodiment, location determination could be performed using GNSS or other high accuracy modality in areas that are unfamiliar or are not frequently visited while location determination could be performed using terrestrial transceivers in areas that are familiar or frequently visited. Similarly, the settings might be, in an embodiment, overridden by user input, either as a default for the entire trip or for a limited time period or for a limited distance along the route.

Also, in an embodiment, the current battery status and/or remaining power may be utilized to determine remaining battery after a mobile device has completed navigation on a route. Similarly, the screen could be turned off in areas that are familiar, providing audio-only output as an alternative, and the screen could be turned on in areas that are unfamiliar. The above discussed parameters are just a few of the device configuration parameters than can be set and, in some embodiments, communicated, to the route server to assist in calculating navigation power usage.

Step 535, "receive the at least one route option," is similar to steps 430 and 530. In Step 535, the mobile device receives, from the route server, or other server, at least one route option for routing between a starting location, such as the current location, and a destination location. In an embodiment, the mobile device may also receive other information associated with the at least one route option. For example, the mobile device may receive a map illustrating each route on a map. In an embodiment, each map may include the starting location and/or the destination location. In an embodiment, some maps may include only part of the route; for example, in an embodiment, the map may include the closest part of the route to the current position. The maps may also illustrate or otherwise highlight points of interest along the route or routes, areas of higher navigation power usage, traffic conditions, and/or areas of slow traffic. The mobile may also receive estimated time to traverse the route or parts of the route thereof, estimated route distance, distance to traverse for selected segments of the route, and other route related information. In an embodiment, the received information may be updated as conditions change. In an embodiment, the updated received information may be sent along with ongoing navigation instruction updates.

In an embodiment, the received information may include at least one indication of at least one navigation power estimate, wherein the indication of the at least one power estimate is associated with the at least one route option. In an embodiment, the at least one indication of at least one navigation power estimate could be indicated as high, medium or low. In an embodiment, the at least one navigation power estimate may comprise an estimated power consumption during navigation. In an embodiment, the estimated power consumption may be based on crowd sourced navigation power utilization and/or position location power utilization that is based on power numbers gathered from a plurality of mobile devices. In an embodiment, the crowd sourced navigation power utilization and/or position location power utilization may be used to determine a predicted power usage for a plurality of points or areas along the route, wherein the predicted power usage for an area may be based upon an average of power usage information received from the plurality of mobile devices. Thus, the mobile may use the predicted power usage for mobile devices using navigation by adding the predicted power usage at each area along any given route, to determine a total estimated power usage for each route option.

In an embodiment, the at least one indication of at least one navigation power estimate for each of the at least one route option could be a related variable such as estimated route traversal time or total route distance that the mobile device may further utilize to determine or modify the at least one indication of at least one navigation power estimate at the mobile device. For example, in an embodiment, an estimated travel time may be multiplied by an average fix rate and an average power per fix at the mobile device to come up with an indication of a navigation power usage estimate for a route. For example, $Power_{route}$=estimated travel time (in units of time/route)×fix rate (in units of fixes/time)×$Power_{fix}$ (in units of Power/number of fixes such as mWatts per fix). For example, in an embodiment, a route distance could be combined with traffic information and/or with speed limit information for each street along the route to determine the traversal time for each route and, as in the prior example, combining traversal time with position location fix rate to determine a navigation power estimate. In an embodiment, the route information may be combined with the traffic and/or speed information on each segment of the route to determine how long the mobile device spends in each area (distance/speed=time per segment) and the navigation power usage estimate (power per fix) for each area may be combined with the time spent in each area and the fix rate (fix per time) to determine estimated power for segments in any given area, the route segment power being added to calculate a total navigation power for each route.

$$Power_{route} = \Sigma Power_{area\ segment\ (1)\ ...\ (n)}$$

$$\Sigma Power_{area\ segment\ (n)} P = (\text{segment length in area } n/\text{speed in segment } n) \times Power_{fix} \times \text{Fix Rate}$$

In Step 545, the various embodiments include those supported by step 440 and step 560. In each case, the mobile device "an indication of an associated navigation power estimate for each of the at least one route option. In an embodiment, the indication of an associated navigation power estimate for each of the at least one route option may be based on an estimate of the navigation power to be used for a given route or, in an embodiment, the indication of an associated navigation power estimate for each of the at least one route option may be based on an estimate of the remaining battery power, once the navigation power used for a given route has been utilized. In an embodiment, an estimate of the remaining battery power, once the navigation power used for a given route has been utilized may be based upon an estimate of current battery power available minus the estimate of the navigation power to be used for a given route. In an embodiment, there may be two or more indications of associated navigation power estimates for at least one of the at least one route option. For example, in an embodiment, there may be indications for a full power option and a reduced power option. In an embodiment, there may be an indication for a full power option and indications for multiple reduced power options (such as mid-power and low power or reduced accuracy and lowest accuracy). In an embodiment, there may be indications for options that affect power such as accuracy and fix rate such as maximum fix rate, reduced fix rate, recommended fix rate or maximum accuracy, recommended accuracy, minimum required accuracy. In various embodiments, the indications for route options and for reduced power options are displayed via a touch screen display and selectable via a touch interface. In various embodiments, the indications for route options and for reduced power options are displayed via a display and selectable via a keypad or button or other physical interface; for example, a button may be depressed to rotate through the route options and held down longer or another button pressed to select a given option. Furthermore, in various embodiments, there may be combinations of options and control interfaces (e.g., knobs, dials and sliders) and interface behavior; for example, power option may be combined with power control options (e.g., a full power option, a recommended power option, and a slider or knob for power control). One skilled in the art would realize that the various described options for power indications and control may be combined or otherwise modified.

As previously discussed, the indication of an associated navigation power estimate may be determined and displayed in various ways and with varying degrees of accuracy. For example, in an embodiment, such as that shown in FIG. 10A, a battery indicator is shown with remaining power levels indicated as bars on the battery and color codes indicating power status. For example, in an embodiment, if the power will be almost gone or drained the indicator may be designated by the color red. In an embodiment, if the power will be significantly drained and/or impacted but not totally drained, the indicator may be designated by the color yellow. In an embodiment, if the remaining power is still significant and regular use of the mobile device will not likely be impacted, the indicator may be designated by the color green.

Similarly, in an embodiment, a remaining power estimate above a first threshold power would be displayed as green. A remaining power estimate below or at the first threshold but above a second threshold power, the second threshold being a lower power level than the first threshold power, would be displayed as yellow. A remaining power estimate below or at the second threshold power would be displayed as red. Note, in various embodiments, other colors may be selected and/or substituted. In some embodiments, the colors and/or the threshold levels of power for each designator may be configurable by the user or configurable programmatically.

In an embodiment, step 545 may further comprise displaying a second associated navigation power estimate, wherein the second indication is associated with a power reduction option and the second associated navigation power estimate is lower than the first associated navigation power estimate. In an embodiment, the power reduction option may comprise reducing location determination rate, a reducing location accuracy, deprioritizing part of the route, ignoring part of the route, turning off GNSS during at least part of the route, running GNSS in a power saving mode, turning off Wi-Fi active scans during at least part of the route, reducing location quality on constrained route components, turning off map display during at least part of the route, reducing map refresh rate during at least part of the route, reducing map brightness during at least part of the route, or turning off GNSS in GNSS signal blocked areas, or a combination thereof. In an embodiment, examples of constrained route components may comprise segments of highway or freeway with no intervening exits, hallways with no intersecting hallways or rooms, and streets with no cross streets.

In an embodiment, step 545 may further comprise displaying an interactive power reduction control indicator associated with the indication of each of the at least one route option. The interactive power reduction control indicator may comprise a knob, slider or dial, whether physical or displayed on a display. In an embodiment, step 545 may further comprise receiving input associated with the interactive power reduction control indicator and selecting at least one power reduction option, wherein the at least one power reduction option comprises reducing location determination rate, a reducing location accuracy, deprioritizing part of the route, ignoring part of the route, turning off GNSS during at least part of the route, running GNSS in a power saving mode, turning off Wi-Fi active scans during at least part of the route, reducing location quality on constrained route components, turning off map display during at least part of the route, reducing map refresh rate during at least part of the route, reducing map brightness during at least part of the route, or turning off GNSS in GNSS signal blocked areas, or combination thereof. In an embodiment, the selected at least one power reduction option may be determined based upon input from a user configuration screen, wherein the user configuration screen comprises multiple power reduction levels, and wherein at least some of the multiple power reduction levels are associated with at least one of the selected at least one power reduction option.

In optional Step 555, based upon a selection input via a user interface on the mobile device, the mobile device may determine a selected route from the at least one route option. As previously discussed, the input via the user interface may be received and/or determined through various means including touch screen input or keypad input or button or dial input or audio input or mouse input or motion input or various combinations thereof. Furthermore, in various embodiments, power management options may be modified via additional input. For example, a touch input could be received from a touch screen. Device tilt information, possibly in combination with a key depression or screen touch or other physical input, could be used to configure the power usage configuration towards higher power configurations or more power efficient power configurations. In such an embodiment where power usage configuration may be modified during the selection of route options, the power usage indicators, such as the battery indicators in FIG. 11 or color codes or numerical measures of power usage or bar charts or other representations of power usage would be updated to reflect a change in power usage configuration. In an embodiment, once the route selection input has been made and, in an embodiment, any power usage configuration changes are made, if any, the route selection input may be finalized with the receipt of an additional input such as a touch selection of a "done" button or depression of a key. In other embodiments, the route selection input may be sufficient to indicate a selected route without further input.

In optional Step 565, the mobile device outputs navigation instructions via a user interface for the selected route. In an embodiment, the navigation instructions are displayed on the user interface or output audibly or a combination thereof as appropriate for the given location on the route. In an embodiment, power usage configuration changes may be made during navigation along the route either via manual user intervention, such as via a power management window to manage power parameters, or power usage configuration changes may be made automatically in response to power dropping below a threshold power. In various embodiments, the threshold may be predetermined while some embodiments, the threshold(s) and/or automatic power usage configuration changes may be determined based upon an estimate of the changes required to maintain navigation to the end of the route without running out of battery power. Furthermore, as traffic conditions and road conditions are subject to change, automatic reconfiguration may be utilized to update power usage configuration changes to achieve a target power status or level at the end of navigation, such as the target power status associated with the route selection at the time of selection. Target power levels may also be reconfigurable in an embodiment, for example, via receiving input into a popup window or other user input session.

Figure 6:
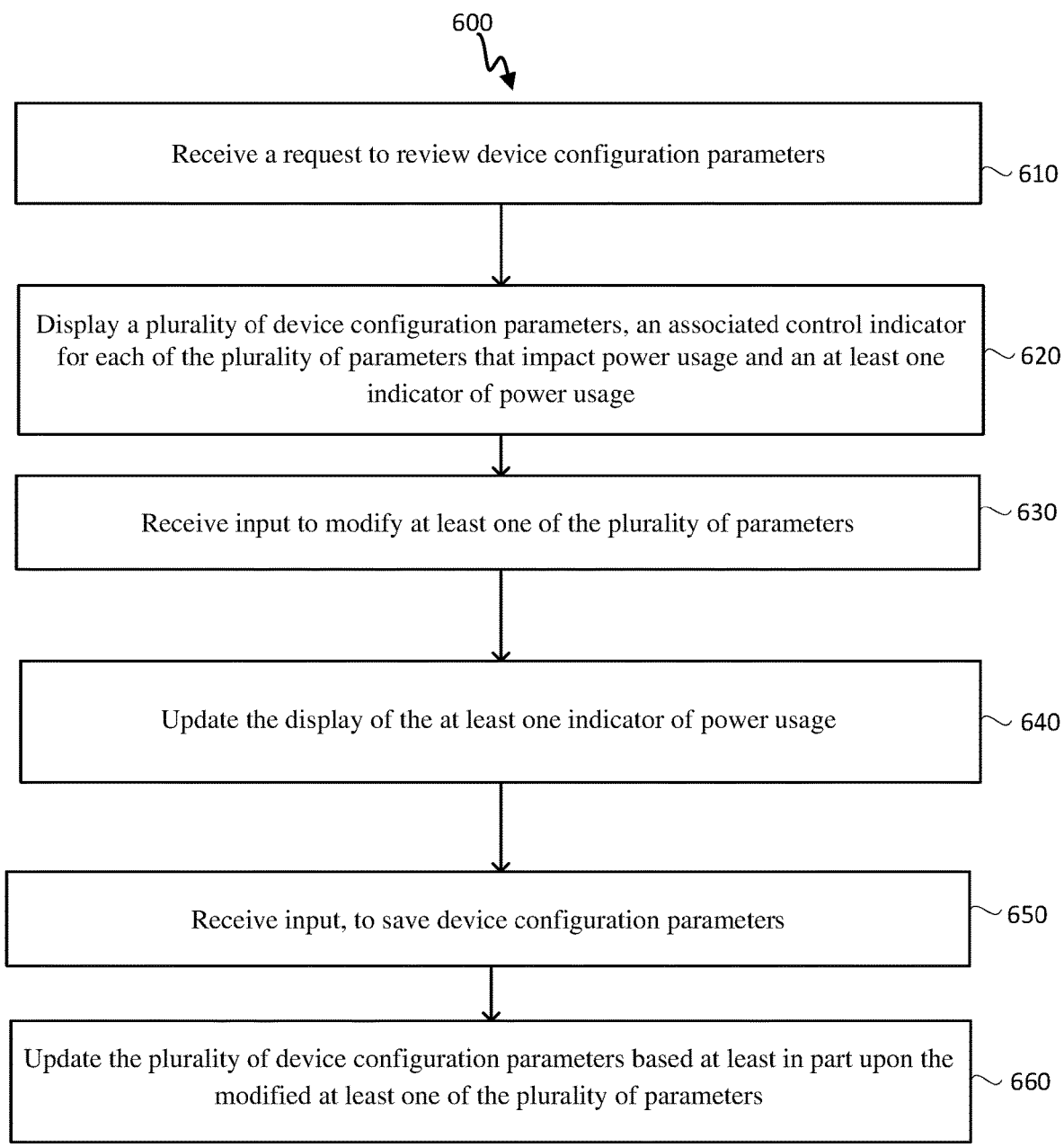
FIG. 6 illustrates an embodiment for a power management and/or power configuration window.

FIG. 6 illustrates a method and technique for requesting and displaying a power management window. The means to implement the methods and techniques of FIG. 6 include, but are not limited to the apparatus and systems of FIGS. 1-3. Referring to FIG. 6, the described methods and techniques allow a power management window to be displayed, enabling access to managing and changing the settings for various device configuration parameters. For example, a non-limiting list of device configuration parameters comprises for power management windows and management of usage options such as display management (refresh rate, content update rate and other display features), image quality, image size, image turnoff, audio mode, audio volume, positioning rates, refresh rates, positioning methods, positioning sources and other settable parameters that may be applicable to and affect the power usage for a wide range of application types such as navigation applications, games, monitoring applications such as safety and medical applications, and tracking applications such as child trackers and fleet trackers.

In step 610, a request is received, from a user interface on the mobile device, to review device configuration parameters. In response to the request to review device configuration parameters, in step 620, the mobile device displays a plurality of device configuration parameters, an associated control indicator for each of the plurality of parameters that impact power usage and an at least one indicator of power usage. A non-limiting example is provided in FIG. 11, which utilizes draggable sliders to determine the settings for device configuration parameters and bar indicators to illustrate the impact on power use for each setting as well as indications of the overall power use rate and/or remaining battery after use for a selected application or selected amount of time.

In step 630, input is received, from a user interface on the mobile device, to modify at least one of the plurality of parameters. For example, in the non-limiting example of FIG. 11, touch screen input may be received, wherein the touch screen input comprises a new position for one of the sliders (e.g., 1110, 1120, 1130, 1140, 1150, 1160 and/or 1170). In an embodiment, the slider (e.g., 1110, 1120, 1130, 1140, 1150, 1160 and/or 1170) would have been dragged to a new position, thereby changing the parameter value and the associated parameter power use (e.g., 1180-1186) associated with that slider. In an embodiment, slider changes may also change overall power indicators such as overall power use rate 1190 or remaining battery after use 1191 or other indications of overall power use or other indications of overall battery status or combinations thereof. In other embodiments, the input may be received via at least one knob or dial displayed on the display, via an at least one physical knob or dial, via a touchscreen keypad or via a physical keypad. In an embodiment, a physical or display-based knob may be rotated to a new setting, a physical or display-based dial may be dragged or rotated to a new setting, or a key board (display-based or physical) may be utilized to set parameter values via key input (for example, "h" or "H" for high, "M" or "m" for medium, and "L" or "l" for low).

In step 640, in an embodiment, the mobile device updates the display of the at least one indicator of power usage. For example, the level indicators or other indicators in FIG. 11, 1180-1186 and 1190-1191 may be updated based upon new settings for one or more of the parameter values. Other nonlimiting examples of indicators include pie indicators, illustrating percentage-based indicators similar to a pie chart, and dials and gauges illustrating settings based upon an indicator position in a displayed dial or gauge.

In Step 650, in an embodiment, the mobile device receives input, from a user interface to save device configuration parameters. For example, an indication to save device configuration parameters may be received through a touch input on button 1195 as may be displayed on a touchscreen display.

In Step 660, the mobile device, in response to the input to save device configuration parameters in Step 650, saves the plurality of device configuration parameters based at least in part upon the modified at least one of the plurality of parameters, into flash or other memory for ongoing access. The modified device configuration parameters are utilized during application execution to control the operation of the application relative to each of the device configuration parameters. Examples of behavior controlled, in some embodiments, by device configuration parameters comprises how output is displayed, how often or even if it is displayed, how often location is calculated, the mode of location calculation, the technologies utilized to calculate location, how routes are managed, or what technologies are used on known versus unfamiliar parts of a route or various combinations thereof.

Figure 7:
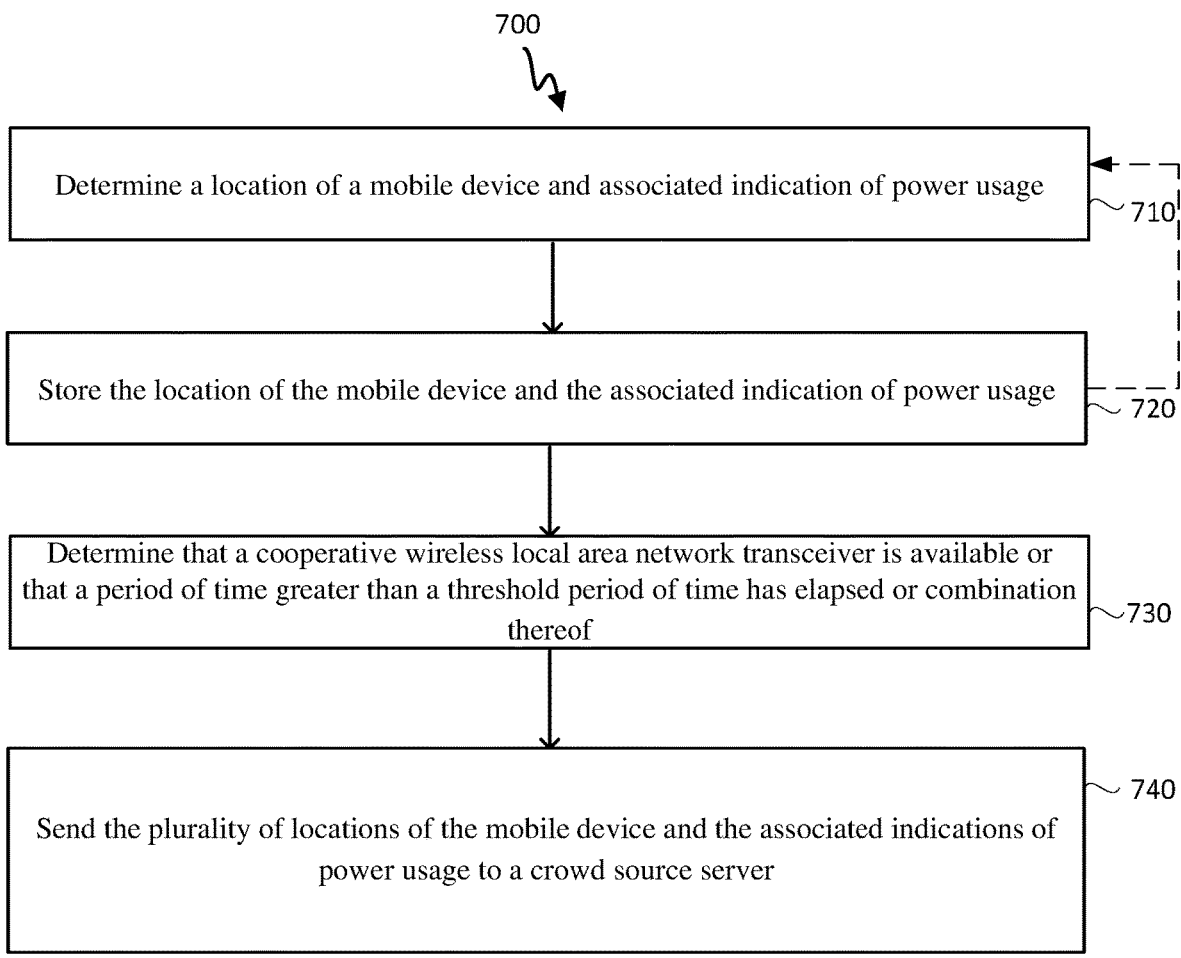
FIG. 7 illustrates an embodiment for recording and uploading location determination power measurements associated with locations to a crowd source server.

Referring to FIG. 7, the described methods and techniques illustrate crowd sourcing of power usage of a mobile device based on location. The means to implement the methods and techniques of FIG. 7 include, but are not limited to the apparatus and systems of FIGS. 1-3. In step 710, the mobile device determines a location of the mobile device and associated indication of power usage. In some embodiments, device configuration parameter information, positioning signal information such as signal strength, TOA, and/or RTT, and/or positioning mode are also determined. In step 720, the mobile device stores, in memory, the location of the mobile device and the associated indication of power usage. The mobile, in various embodiments, may also store associated information related to mode of location determination and environmental indicators relative visibility of different types of location signals (for example, signals from GNSS, WAN, Wi-Fi, and/or PAN transmitters). The mobile, in various embodiments, may also store current device configuration parameters at the time of location determination. As the mobile does additional location determination, steps 710 and 720 are repeated, storing location, associated power usage and, optionally, other associated information, as described above, for each location. This information is stored until a suitable cooperative access point or, in some embodiments, a cooperative base station or other cooperative transceiver is available to upload the information to a crowd sourcing server, as shown in Step 730. In Step 730, Determine that a cooperative wireless local area network (WLAN) transceiver is available, a cooperative transceiver being a transceiver that the mobile device can connect to and send and receive data with. For example, a cooperative WLAN transceiver is a WLAN transceiver which either does not require a passcode, for which the mobile device is aware of the passcode, for which the mobile device receives the passcode (for example, for WEP and other encryption standards), or for which the mobile device can, through various means, connect to and send and receive data. A cooperative WAN transceiver and/or a cooperative PAN transceiver are, for example, similarly transceivers that the mobile can connect to and can, through various means, connect to and send and receive data. In an embodiment, the mobile device may accumulate the location, power and other associated data on the mobile device until a cooperative transceiver is accessed to upload the location, power and other associated data. The cooperative transceiver for the upload may be chosen by various means. For example, the cooperative transceiver may be chosen for being the first cooperative transceiver or for being the first cooperative transceiver of a particular type such as the first cooperative Wi-Fi transceiver. The cooperative transceiver may be chosen for being the first cooperative transceiver available after a predetermined period of time, such as 12 hours. The cooperative transceiver may be chosen for being the first cooperative transceiver of a particular type (e.g., first Wi-Fi cooperative transceiver or first charge-free transceiver or first secure transceiver) connected to after a predetermined period of time. Other combinations of the above may be implemented in various embodiments.

In step 740, the mobile device sends the plurality of locations of the mobile device and the associated indications of power usage to a crowd source server. In various embodiments, other associated information, as described above, may also be sent to the crowd source server.

Figure 8:
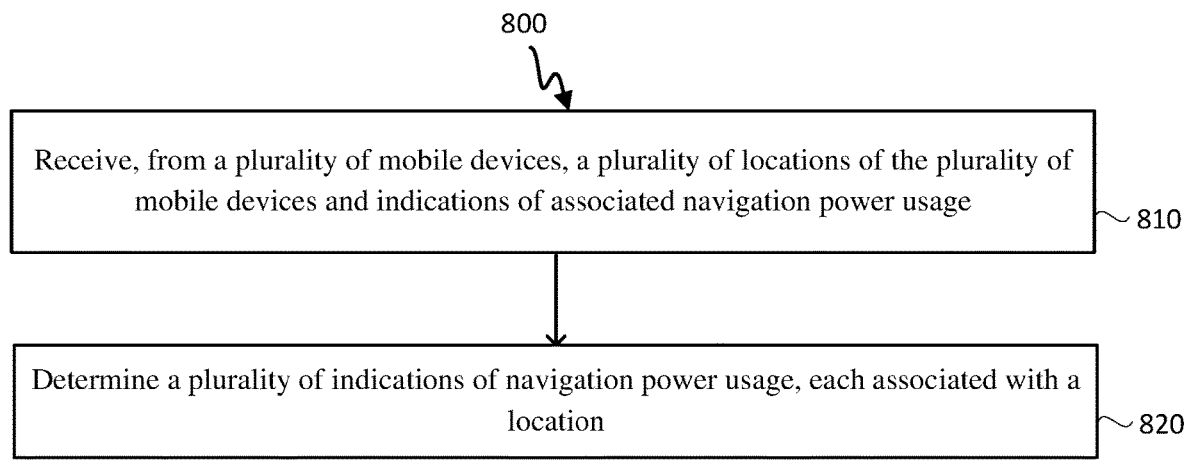
FIG. 8 illustrates an embodiment for a server that determines power use for position determination, or in some embodiments for other purposes and applications, based on location.

Referring to FIG. 8, the described methods and techniques illustrate the collection and analysis of location information, power information and, in some embodiments, other associated information, from a plurality of mobile devices. The means to implement the methods and techniques of FIG. 8 include, but are not limited to the apparatus and systems of FIGS. 1-3. In Step 810, in an embodiment, the crowd source server or other server, receives, from a plurality of mobile devices, a plurality of locations of the plurality of mobile devices and indications of associated navigation power usage. In various embodiments, other associated information, as described above, may also be received by the crowd source server. For example, associated information may comprise device configuration parameter information, as also described above, positioning signal information such as signal strength, time of arrival (TOA), and/or round trip time (RTT), and/or positioning mode.

In Step 820, the crowd source or other server determines a plurality of indications of navigation power usage, each associated with a location. In an embodiment, the crowd source server or other server analyzes the received data, received from a plurality of mobile devices, to determine an average or typical navigation power usage at each location or locus of locations. In various embodiments, the navigation power estimates may be further grouped by other associated information, as described above. For example, associated navigation power usage may be grouped to control not only for location but to also combine the navigation power data into groups with the same or similar configuration parameters at any given location. In an embodiment, the crowd source server can determine navigation power usage data for any given location that controls for the configuration parameters already set on the mobile device. Navigation power usage estimates for any given route may, in some embodiments, be based upon navigation power data received from mobile devices with the same or similar configuration parameters as the requesting mobile device. The navigation power usage estimates for any given route may, in some embodiments, be calculated on the crowd source server and, in other embodiments be calculated on a route server, which also determines and provides the route options.

Figure 9:
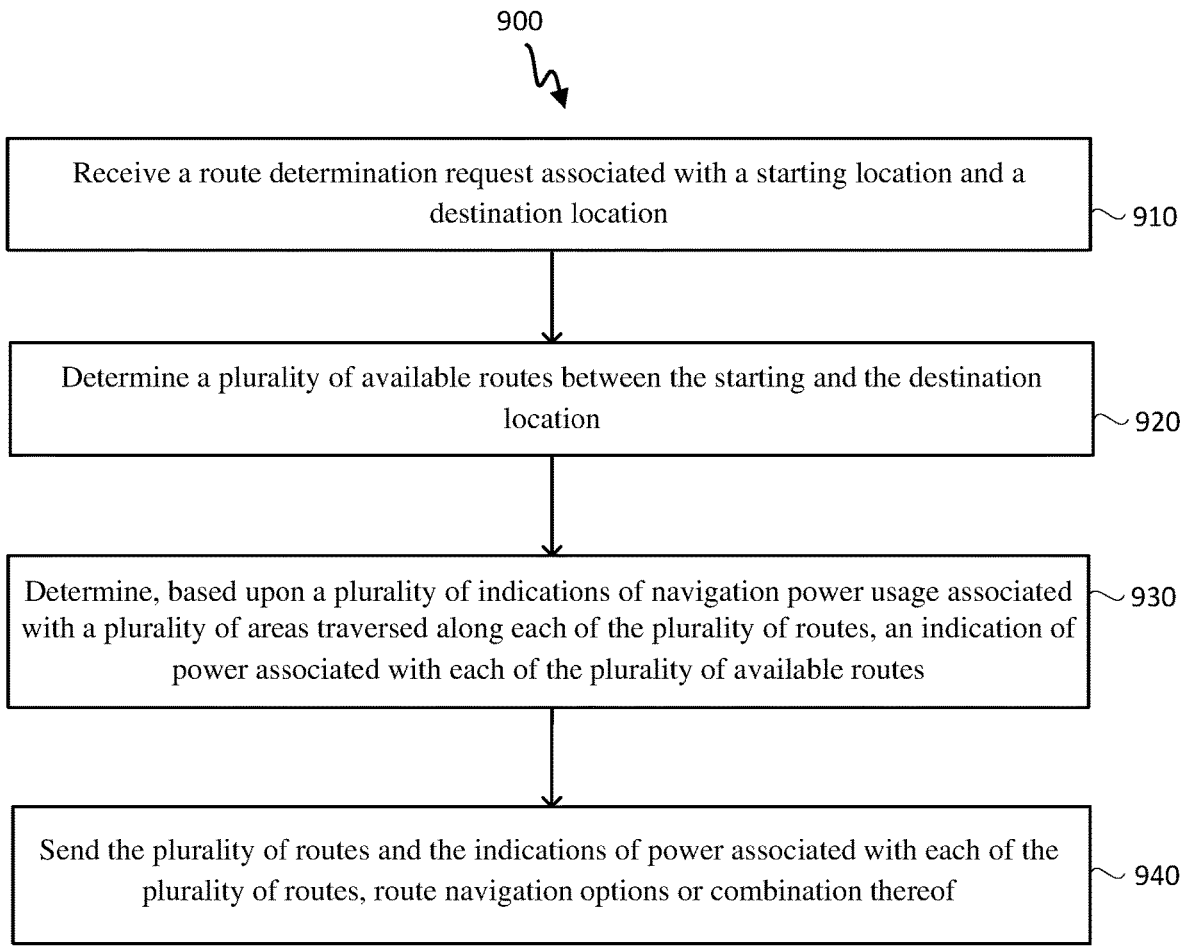
FIG. 9 illustrates an embodiment for a server that provides route and power indication information for mobile device navigation.

Referring to FIG. 9, the route server determines and provides route information and associated navigation power information, which is provided to the mobile device for selection and subsequent navigation. The means to implement the methods and techniques of FIG. 9 include, but are not limited to the apparatus and systems of FIGS. 1-3. In step 910, in an embodiment, the route server receives a route determination request associated with a starting location and a destination location. In many embodiments, the starting location is the current location of the mobile device at the time of the request. In step 920, in an embodiment, the route server determines a plurality of available routes between the starting location and the destination location.

In step 930, the route server determines, based upon a plurality of indications of navigation power usage associated with a plurality of areas (or locations in a more granular system) traversed along each of the plurality of routes, an indication of power associated with each of the plurality of available routes. In an embodiment, for example, the total navigation power usage for a route may be determined by summing the navigation power usage estimate in each of a series of areas traversed by the route. In an embodiment, the navigation power usage estimate in each area may, in an embodiment, be determined by multiplying the location fix rate by the estimated time spent in an area by the average navigation power usage per location fix. In another embodiment, the navigation power usage estimate in each area may, in an embodiment, may be determined by multiplying the location fix rate per distance by the estimated distance traversed in an area by the average navigation power usage per location fix in an area. In step 940, in an embodiment, the route server sends the plurality of routes and the indications of power associated with each of the plurality of routes to the mobile device.

Figure 10A:
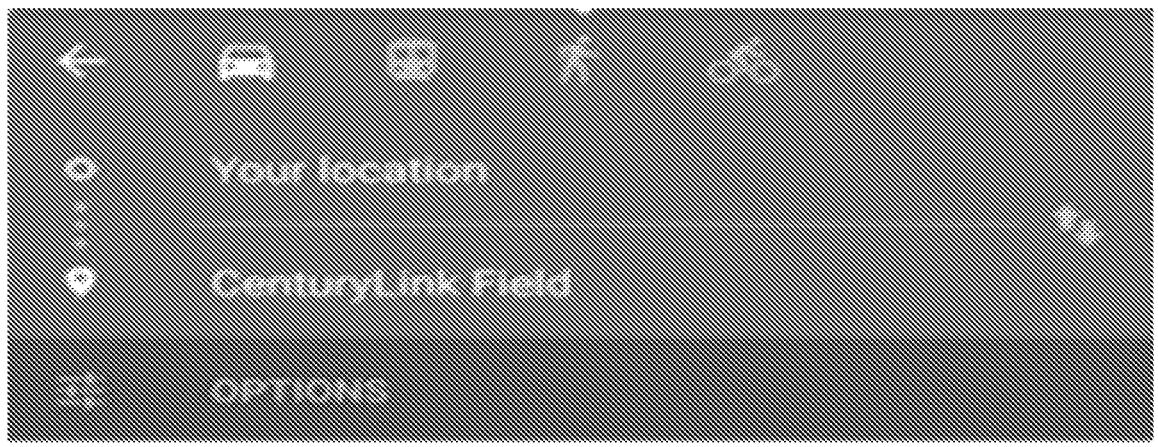
FIG. 10A illustrates a sample display illustrating available routes and associated power indications.
Figure 10A:
Figure 10A:
Figure 10A:
Figure 10A:

Referring to FIG. 10A, in an embodiment, the amount of power used for navigation using each route or the amount of remaining power after navigation using each route may be illustrated by color coded batteries. The means to implement the example interface of FIG. 10A include, but are not limited to the apparatus and systems of FIGS. 1-3. In an embodiment that illustrates remaining battery power, as in FIG. 10A, for example, significant remaining battery power may be color-coded green which would be associated, in this case with the lowest of the three batteries. Little or no remaining battery power may be color-coded red, which would be associated with the middle battery with the narrowed/lowest power indicator. A moderate amount of remaining battery power may be color-coded yellow, as illustrated by the top battery indication. In embodiments, which illustrate total battery power utilized, the opposite may be true. The route that uses the least battery power may be indicated by a narrow bar that is green; the route that uses the most battery power may be illustrated with a thicker red bar. Routes that use a moderate amount of power may be illustrated with a medium thickness yellow bar. In some embodiments, both estimated power to be used along a route and remaining battery power may be illustrated.

Figure 10B:
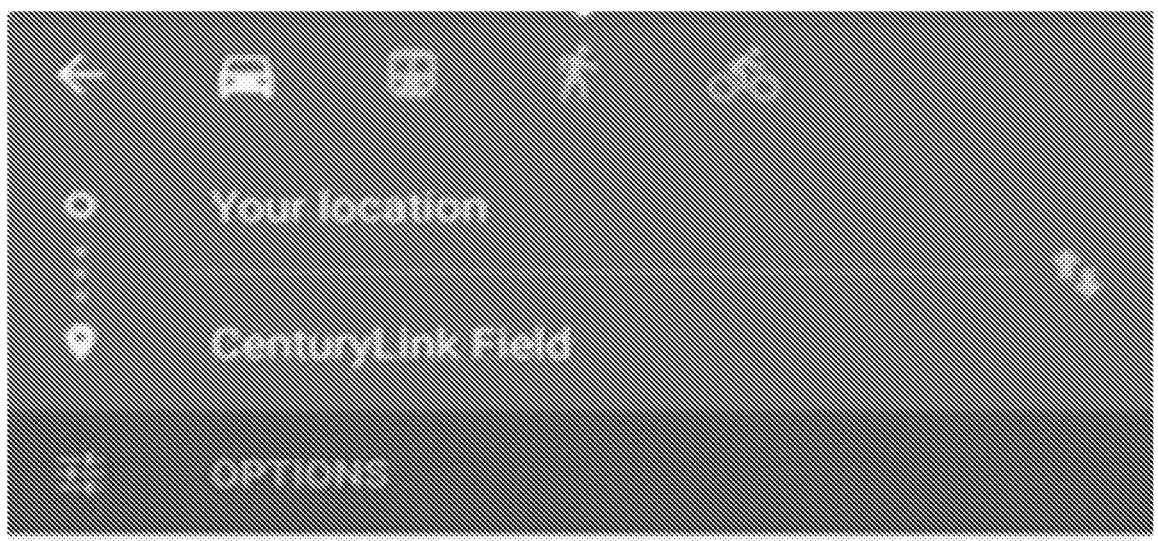
FIG. 10B illustrates a sample display illustrating available routes and associated power indications, including power management control sliders.

Referring to FIG. 10B, the embodiment of FIG. 10A may be further enhanced through the presentation of an associated interactive power reduction control indicator for each route option. The interactive power reduction control indicator may be a knob, a dial or a slide or other interactive input indicator. Shown in FIG. 10B, a power use slider is associated with each route. In an embodiment, input received from a touchscreen display indicating that the slider has been moved, will select different power configuration options with power conserving options being on one side of the slider and options that consume more power being on the other side of the slider. A knob or dial would similarly select different power configuration options with power conserving options being on one side of the knob or dial and options that consume more power being on the other side of the knob or slider. The different power configuration options may be pre-configured or, in some embodiments, may be configured by the user. In some embodiments, the battery power indicator or battery usage indicator may reflect changes in power configuration option selection by displaying new power levels and/or new levels of remaining battery associated with and/or determined using the selected power configuration option for any given route. The means to implement the example interface of FIG. 10B include, but are not limited to the apparatus and systems of FIGS. 1-3.

Figure 11:
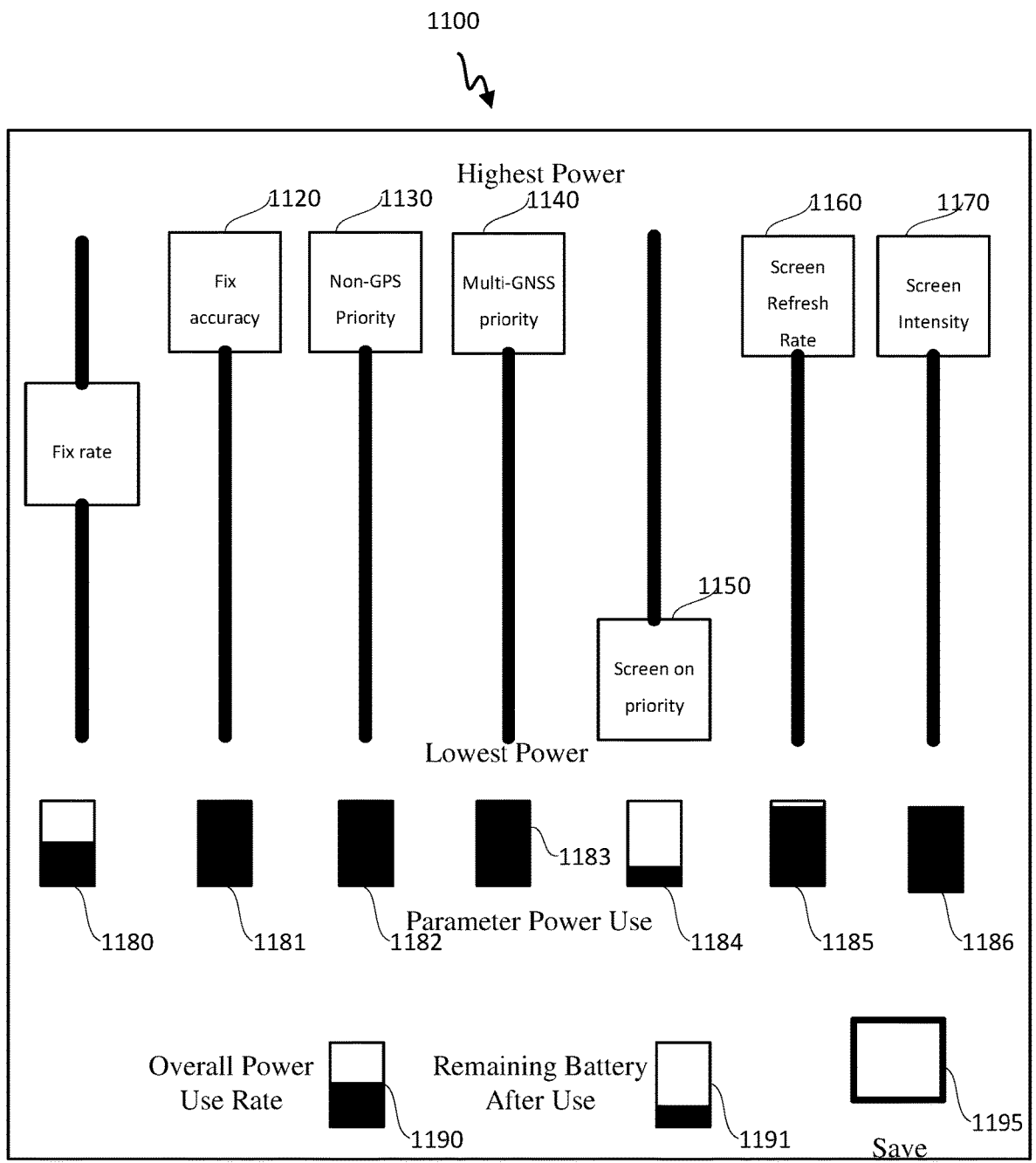
FIG. 11 illustrates an embodiment for a power configuration window.

Referring to FIG. 11, a non-limiting embodiment is provided in FIG. 11, which utilizes draggable sliders to determine the settings for device configuration parameters and utilizes bar indicators to illustrate the impact on power use for each setting as well as indications of the overall power use rate and/or remaining battery after use for a selected application or selected amount of time or a selected distance. The means to implement the example interface of FIG. 11 include, but are not limited to the apparatus and systems of FIGS. 1-3. In the non-limiting example of FIG. 11, touch screen input may be received, wherein the touch screen input comprises a new position for one or more of the sliders (e.g., 1110, 1120, 1130, 1140, 1150, 1160 and/or 1170). In an embodiment, the slider (e.g., 1110, 1120, 1130, 1140, 1150, 1160 and/or 1170) may be dragged to a new position, thereby changing the parameter value and the associated parameter power use (e.g., 1180-1186) associated with that slider. In an embodiment, slider changes may also change overall power indicators such as overall power use rate 1190 or remaining battery after use 1191 or other indications of overall power use or other indications of overall battery status or combinations thereof. In an embodiment, changes in the parameter values may be stored into memory for use during navigation or other applications. In an embodiment, receiving a tap or touch input associated with a save button 1195, may trigger saving the designated parameter values.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home. In such an implementation, one or more mobile devices may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Gallileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of route selection on a mobile device, comprising:
   receiving, by the mobile device, a request for navigation;
   sending, from the mobile device, a request for routing information in response to the request for navigation;
   receiving, by the mobile device, a plurality of route options associated with the request for routing information, wherein each of the plurality of route options designates a different route between a start location and a destination location;
   displaying, by the mobile device, for each of the plurality of route options, an indication of a first associated navigation power estimate.

2. The method of claim 1, further comprising receiving, by the mobile device, the first associated navigation power estimate for each of the plurality of route options.

3. The method of claim 1, further comprising sending, by the mobile device, mobile device power configuration information.

4. The method of claim 1, wherein the request for navigation is received from a user interface on the mobile device comprising a touch screen or a keypad or an audio interface or combination thereof.

5. The method of claim 1, further comprising determining, by the mobile device, a navigation power estimate for each of the plurality of route options.

6. The method of claim 5, further comprising receiving, by the mobile device, an associated estimated route distance for each of the plurality of route options.

7. The method of claim 6, wherein the first associated navigation power estimate for each of the plurality of route options is based, at least in part, on the associated estimated route distance.

8. The method of claim 5, further comprising receiving, by the mobile device, an estimated travel time for each of the plurality of route options.

9. The method of claim 8, wherein the first associated navigation power estimate for each of the plurality of route options is based, at least in part, on the estimated travel time for each of the plurality of route options.

10. The method of claim 1, wherein the indication of the first associated navigation power estimate for each of the plurality of route options is based on an estimate of mobile device battery power used for navigation for each of the plurality of route options.

11. The method of claim 1, wherein the indication of the first associated navigation power estimate for each of the plurality of route options is based on estimated remaining mobile device battery power after navigation using each of the plurality of route options.

12. The method of claim 1, further comprising:
 determining a selected route from the plurality of route options; and
 outputting navigation instructions via a user interface for the selected route.

13. The method of claim 1, further comprising receiving a request for low power navigation options.

14. The method of claim 1, further comprising displaying an indication of a second associated navigation power estimate for at least one of the plurality of route options, wherein the second associated navigation power estimate is lower than the first associated navigation power estimate and wherein the second associated navigation power estimate is associated with a power reduction option.

15. The method of claim 14, wherein the power reduction option comprises reducing location determination rate, a reducing location accuracy, deprioritizing part of a route, ignoring part of a route, turning off GNSS during at least part of a route, running GNSS in a power saving mode, turning off Wi-Fi active scans during at least part of a route, reducing location quality on constrained route components, turning off map display during at least part of a route, reducing map refresh rate during at least part of a route, reducing map brightness during at least part of a route, or turning off GNSS in GNSS signal blocked areas, or combination thereof.

16. The method of claim 1, further comprising displaying an interactive power reduction control indicator associated with the indication of each of the plurality of route options.

17. The method of claim 16, wherein the interactive power reduction control indicator comprises a knob, slider or dial.

18. The method of claim 16, further comprising receiving input associated with the interactive power reduction control indicator and selecting at least one power reduction option, wherein the at least one power reduction option comprises reducing location determination rate, a reducing location accuracy, deprioritizing part of a route, ignoring part of a route, turning off GNSS during at least part of a route, running GNSS in a power saving mode, turning off Wi-Fi active scans during at least part of a route, reducing location quality on constrained route components, turning off map display during at least part of a route, reducing map refresh rate during at least part of a route, reducing map brightness during at least part of a route, or turning off GNSS in GNSS signal blocked areas, or combination thereof.

19. The method of claim 18, wherein the selected at least one power reduction option is determined based upon input from a user configuration screen.

20. A mobile device comprising:
 one or more processing units configured to receive a request for navigation; and
 a wireless transceiver coupled to the one or more processing units and configured to:
 send a request for routing information in response to the request for navigation; and
 receive a plurality of route options associated with the request for routing information, wherein each of the plurality of route options designates a different route between a start location and a destination location;
 wherein the one or more processing units are further configured to:
 display, using a user interface on the mobile device, an indication of a first associated navigation power estimate for each of the plurality of route options.

21. The mobile device of claim 20, wherein the one or more processing units are further configured to determine a navigation power estimate for each of the plurality of route options, wherein the first associated navigation power estimate for each of the plurality of route options is based, at least in part, on an associated estimated route distance or on an associated estimated travel time, or a combination thereof, for each of the plurality of route options.

22. The mobile device of claim 20, wherein the indication of the first associated navigation power estimate for each of the plurality of route options is based on an estimate of mobile device battery power used for navigation for each of the plurality of route options or on estimated remaining mobile device battery power after navigation using each of the plurality of route options on combination thereof.

23. The mobile device of claim 20, wherein the one or more processing units are further configured to display an indication of a second associated navigation power estimate associated with the plurality of route options, wherein the second associated navigation power estimate is associated with a power reduction option and the second associated navigation power estimate is lower than the first associated navigation power estimate.

24. The mobile device of claim 23, further comprising a GNSS receiver or a Wi-Fi transceiver or combination thereof, wherein the power reduction option comprises reducing location determination rate, reducing location accuracy, deprioritizing part of a route, ignoring part of a route, turning off GNSS during at least part of a route, running GNSS in a power saving mode, turning off Wi-Fi active scans during at least part of a route, reducing location quality on constrained route components, turning off map display during at least part of a route, reducing map refresh rate during at least part of a route, reducing map brightness during at least part of a route, or turning off GNSS in GNSS signal blocked areas, or combination thereof.

25. The mobile device of claim 20, wherein the one or more processing units are further configured to display an interactive power reduction control indicator associated with the indication of each of the plurality of route options.

26. The mobile device of claim 25, wherein the interactive power reduction control indicator comprises a knob, slider or dial.

27. The mobile device of claim 26, wherein the one or more processing units are further configured to receive input associated with the interactive power reduction control indicator and select at least one power reduction option, wherein the at least one power reduction option comprises reducing location determination rate, reducing location accuracy, deprioritizing part of a route, ignoring part of a route, turning off GNSS during at least part of a route, running GNSS in a power saving mode, turning off Wi-Fi active scans during at least part of a route, reducing location quality on constrained route components, turning off map display during at least part of a route, reducing map refresh rate during at least part of a route, reducing map brightness during at least part of a route, or turning off GNSS in GNSS signal blocked areas, or combination thereof.

28. A mobile device comprising:
   means for receiving, at the mobile device, a request for navigation;
   means for sending, from the mobile device, a request for routing information in response to the request for navigation;
   means for receiving, by the mobile device, a plurality of route options associated with the request for routing information, wherein each of the plurality of route options designates a different route between a start location and a destination location;
   means for displaying, by the mobile device, an indication of a first associated navigation power estimate for each of the plurality of route options.

29. The mobile device of claim 28, further comprising means for receiving, by the mobile device, the first associated navigation power estimate for each of the plurality of route options.

30. The mobile device of claim 28, further comprising means for determining, by the mobile device, the first navigation power estimate for each of the plurality of route options.

31. The mobile device of claim 28, further comprising means for displaying an indication of a second associated navigation power estimate for at least one of the plurality of route options, wherein the second associated navigation power estimate is lower than the first associated navigation power estimate and wherein the second associated navigation power estimate is associated with a power reduction option.

32. A non-transitory computer-readable medium having stored thereon computer-readable instructions, for route selection on a mobile device, configured to cause a computer of a mobile wireless device to:
   send a request for routing information in response to the request for navigation; and
   receive a plurality of route options associated with the request for routing information, wherein each of the plurality of route options designates a different route between a start location and a destination location;
   wherein the one or more processing units are further configured to:
   display, using a user interface on the mobile device, an indication of an associated navigation power estimate for each of the plurality of route options.

* * * * *